US008787737B2

(12) United States Patent
Wald et al.

(10) Patent No.: US 8,787,737 B2
(45) Date of Patent: Jul. 22, 2014

(54) VIDEO TRICK MODE SYSTEM

(75) Inventors: Stephanie Wald, Jerusalem (IL); Ezra Darshan, Beit Shemesh (IL); David Fink, Efrat (IL); Kevin Murray, Fordingbridge (GB)

(73) Assignee: Cisco Technology Inc., San Jose, CA (US)

( * ) Notice: Subject to any disclaimer, the term of this patent is extended or adjusted under 35 U.S.C. 154(b) by 1307 days.

(21) Appl. No.: 11/990,356

(22) PCT Filed: Jun. 29, 2006

(86) PCT No.: PCT/IL2006/000762
§ 371 (c)(1),
(2), (4) Date: Mar. 24, 2008

(87) PCT Pub. No.: WO2007/020621
PCT Pub. Date: Feb. 22, 2007

(65) Prior Publication Data
US 2008/0273858 A1    Nov. 6, 2008

Related U.S. Application Data

(60) Provisional application No. 60/708,151, filed on Aug. 15, 2005.

(51) Int. Cl.
*H04N 5/783* (2006.01)
(52) U.S. Cl.
USPC ......................................... 386/347; 386/348
(58) Field of Classification Search
USPC .................................................. 386/347, 348
See application file for complete search history.

(56) References Cited

U.S. PATENT DOCUMENTS

| 5,835,672 | A | | 11/1998 | Yagasaki et al. |
| 5,841,941 | A | * | 11/1998 | Morimoto et al. ............ 386/324 |
| 6,009,229 | A | | 12/1999 | Kawamura |

(Continued)

FOREIGN PATENT DOCUMENTS

| EP | 0 787 409 B1 | 4/2003 |
| EP | 1 437 894 A2 | 7/2004 |

(Continued)

OTHER PUBLICATIONS

Aug. 4, 2010 Office Communication in connection with prosecution of EP 06 75 6233.0.

(Continued)

*Primary Examiner* — Thai Tran
*Assistant Examiner* — Jose Mesa
(74) *Attorney, Agent, or Firm* — Husch Blackwell LLP

(57) ABSTRACT

A method for producing an auxiliary video stream arranged for reverse trick mode playback from a video stream including a plurality of uni-directional predicted frames, the method including producing the auxiliary video stream by performing the following steps copying each uni-directional predicted frame included in the video stream into a memory, thereby producing a plurality of copied frames in the memory, replacing each one of the plurality of copied frames with one corresponding supplemental frame, thereby producing a plurality of corresponding supplemental frames, and producing a copy of the video stream arranged in reverse processing order, the producing a copy including replacing each frame which corresponds to one of the plurality of copied frames with the one corresponding supplemental frame from among the plurality of corresponding supplemental frames. Related methods and systems are also described.

29 Claims, 7 Drawing Sheets

(56) References Cited

U.S. PATENT DOCUMENTS

| | | | |
|---|---|---|---|
| 6,118,498 A * | 9/2000 | Reitmeier | 348/725 |
| 7,426,306 B1 * | 9/2008 | Kita et al. | 382/238 |
| 7,620,294 B2 * | 11/2009 | Green et al. | 386/346 |
| 7,627,227 B2 * | 12/2009 | Evans et al. | 386/347 |
| 2003/0231867 A1 | 12/2003 | Gates et al. | |
| 2004/0012510 A1 * | 1/2004 | Chen | 341/50 |
| 2004/0154041 A1 * | 8/2004 | Zhang | 725/74 |
| 2004/0199658 A1 | 10/2004 | Darshan et al. | |
| 2004/0223736 A1 | 11/2004 | Lin et al. | |
| 2004/0258393 A1 | 12/2004 | Lin et al. | |
| 2004/0264924 A1 | 12/2004 | Campisano et al. | |
| 2005/0229072 A1 | 10/2005 | Setton et al. | |
| 2006/0029364 A1 | 2/2006 | Kosugi | |
| 2006/0126724 A1 * | 6/2006 | Cote et al. | 375/240.03 |
| 2006/0262227 A1 * | 11/2006 | Jeong | 348/723 |
| 2007/0019675 A1 * | 1/2007 | Weber | 370/468 |
| 2009/0052471 A1 * | 2/2009 | Pasqualino et al. | 370/493 |

FOREIGN PATENT DOCUMENTS

| | | |
|---|---|---|
| WO | WO 01/35669 A1 | 5/2001 |
| WO | WO 03/010970 A2 | 2/2003 |
| WO | WO 03/036966 A1 | 5/2003 |
| WO | WO 2005/055600 A1 | 6/2005 |
| WO | WO 2006/018827 A2 | 2/2006 |

OTHER PUBLICATIONS

J.P. van Gassel et al., "MPEG-2 Compliant Trick Play Over a Digital Interface" IEEE Transactions on Consumer Electronics, pp. 170-171 (IEEE Jun. 18, 2002).

Michael Vernick et al., "Adventures in Building the Stony Brook Video Server" (ACM Multimedia 96, Boston, MA, 1996, pp. 287-295).

"Information Technology-Generic Coding of Moving Pictures and Audio: Systems, Final Draft Amendment 3: Transport of AVC video data over ITU-T Rec H.222.0|ISO/IEC 13818-1 streams" (International Standard ISO/IEC 13818-1:2000/FDAM3, Trondheim, Jul. 2003).

Jan. 16, 2012 Office Communication in connection with prosecution of EP 11 189 390.5.

Jan. 18, 2012 Office Communication in connection with prosecution of EP 11 189 406.9.

*Information technology—Generic coding of moving pictures and associated audio Information: Video*, ISO/IEC 13818-2 2nd ed., pp. 71-73 (Dec. 15, 2000).

Jan. 2, 2014 Office Communication received in connection with prosecution of EP 11 189 406.9.

Jan. 3, 2014 Office Communication received in connection with prosecution of EP 11 189 390.5.

\* cited by examiner

VIDEO TRICK MODE SYSTEM

RELATED APPLICATION INFORMATION

The present application is a 35 USC §371 application of PCT/IL2006/000762, filed on 29 Jun. 2006 and entitled "Video Trick Mode System", which was published in the English language with International Publication Number WO 2007/020621, and which claims the benefit of priority based on U.S. Provisional Patent Application Ser. No. 60/708,151, filed 15 Aug. 2005, entitled, "Reverse Video". The disclosure of U.S. Provisional Patent Application 60/708,151 is incorporated herein by reference.

FIELD OF THE INVENTION

The present invention relates to video broadcast and more particularly to enhancing video broadcast to improve trick modes efficiency.

BACKGROUND OF THE INVENTION

PCT Patent Application PCT/IL00/00276 of NDS Ltd., filed 16 May 2000, published in the English language as WO 01/35669, and corresponding unpublished U.S. patent application Ser. No. 09/574,096 of Darshan, et al, describe a method for processing a data stream including receiving a transport stream (TS), storing at least a portion of the TS, the at least a portion of the TS having a beginning and including a plurality of TS packets, determining, from among the plurality of TS packets, at least one TS packet including a candidate access point, storing in an index store a byte offset of the candidate access point, and storing in the index store a plurality of indications of byte offset, each byte offset being associated with an arrival time of a received TS packet.

PCT Patent Application PCT/IL02/00534 of NDS Ltd., filed 30 Jun. 2002, published in the English language as WO 03/010970 and corresponding unpublished U.S. patent application Ser. No. 10/479,373 of Darshan, et al, describes a method for accessing a desired point in time-synchronized data within a stream, the stream being associated with a desired point within a time-synchronized data stream, determining a stream access point, decoding the stream beginning at the stream access point, and assigning a time associated with the stream access point as a utilization time.

PCT Patent Application PCT/IL2005/000685, published as WO 2006/018827, filed 28 Jun. 2005, describes a method for providing access to operation information related to a digital signal, including providing a digital signal encoded, in accordance with a layered encoding scheme, in a plurality of layers, and extracting operation information from a first layer of encoding within the digital signal, and placing the extracted information in a second layer of encoding within the digital signal.

US Published patent application US 2004/258393 of Lin et al describes a method and system for performing a trick mode on a video signal containing a plurality of original pictures. The method includes the steps of receiving a trick mode command and selectively inserting at least one dummy predictive picture in the trick mode video signal using at least one prediction scheme among field-based prediction and frame-based prediction. In one arrangement, the selectively inserting step can include the step of selectively inserting at least a first dummy predictive picture in the video signal using field-based prediction and subsequent dummy predictive pictures in the trick mode video signal using frame-based prediction.

U.S. Pat. No. 6,009,229 to Kawamura describes an apparatus and method of recording coded picture data on a recording medium which operates to receive the picture data (e.g., a video data), code the picture data using intra-picture coding and/or predictive coding to provide one I-picture and one succeeding P-picture, generate positional information representing the positions of the I-picture and the P-picture relative to the I-picture, and record the I-picture, the P-picture, and the positional information on the recording medium. The coded picture data is reproduced from the recording medium in a special reproduction mode by selectively reading the data using the positional information.

European Patent EP 0787409 describes a consumer digital video cassette recorder which records an advanced television signal having an MPEG like signal format. The predictive nature of the MPEG like signal requires that additional I-frame data be generated and recorded together with a normal play speed data stream to facilitate non-standard speed, or trick play reproduction. Additional I-frame data streams are generated specifically for each replay speed and are written within recorded tracks to facilitate reproduction at the predetermined speed.

*Adventures in Building the Stony Brook Video Server*, by Vernick et al., Proceedings of ACM Multimedia '96, 199.6, describes the experiences and implementation details of building the Stony Brook Video Server (SBVS), an Ethernet-based server built in the Experimental Computer Systems Lab at Stony Brook. It employs only off-the-shelf PC components and is capable of guaranteeing the real-time delivery of digital video streams from the server's disk subsystem, through an Ethernet network, to an end user's display. The SBVS integrates a software-based disk array with a Real-Time Ethernet Protocol, RETHER, which guarantees the smooth delivery of multimedia data while allowing nonreal-time traffic to coexist on the same LAN. While outlining all of the design issues that must be addressed when building a LAN based video server, this paper focuses on three main design and implementation issues: 1) retrieval algorithms for reading multimedia files from a software-driven disk array for supporting normal playback, slow-motion playback, and rewind; 2) buffer management and organization; and, 3) client-side support for rewind of MPEG video streams. The paper also presents several unanticipated problems that arose when implementing the SBVS and their solutions.

A secure video processor, SVP, is described in detail at www.svpalliance.org.

Video-on-Demand (VOD) servers are capable of receiving video and re-encoding the received video on the fly, and/or reading multiple versions of the same video in order to send the video to a client enabled to play trick modes (for example in reverse, fast forward).

Video encoding and compression standards are well known in the art. Video encoding and compression standards believed to reflect the state of the art include:

ISO/IEC 13818-1:2000, MPEG-2 Systems Specification;
ISO/IEC 13818-2:2000, MPEG-2 Video Specification;
ISO/IEC 14496-2:1999 MPEG-4 Video Specification;
ISO/IEC 13818-1:2000, FDAM3 MPEG-2 Systems Specification Amendment 3, Transport of AVC Video Data over ITU-T Rec H.222.0/ISO/IEC 13818-1 Streams;
ISO/IEC 14496-10:2003 MPEG-4 AVC Video Specification; and
SMPTE 241 Proposed SMPTE Standard for Television: VC-1 Compressed Video Bitstream Format aid Decoding Process.

The disclosures of all references mentioned above and throughout the present specification, as well as the disclosures of all references mentioned in those references, are hereby incorporated herein by reference.

SUMMARY OF THE INVENTION

The ability of Personal Video Recorders (PVRs) to render video at speeds other than normal speeds and to play video backwards at various speeds is known in the art as "trick modes".

Typically, video encoding standards rely on two difference types of frames: key frames and predictive frames.

Specifically, key frames, sometimes referred to as "intra-coded" frames, or I-frames, preferably comprise frames that are coded using purely intra-coding, with reference to no other field or frame information. I-frames are preferably used as a reference for compressing other frames.

Typically, there are two types of predictive frames: P-frames and B-frames. A P-frame, more formally referred to as a "predicted" frame, is a frame produced using forward prediction. P-frames preferably comprise predictions that are coded using motion-compensated predictions from either previous I-frames or previous P-frames. The P-frame is used as a reference for (in presentation order) future P-frames and future or previous B-frames. A B-frame, or "bi-directional" frame, is a bi-directionally predictive coded picture/frame: a picture that is coded using motion-compensated prediction from previous and/or future I-frames or P-frames. Those skilled in the art will appreciate that frames are typically broadcast in an order which is appropriate for processing by a decoder, and not in presentation order.

It is appreciated that trick mode playback by a set top box entails playback without modifying parts of a broadcast stream sent to the decoder.

At the present time MPEG, VC-1, and other video encoding standards define a one way video data stream; that is, because of the predictive nature of the P-frames and B-frames described above, the video data stream is designed only to be played out in a forward direction. However, trick modes are becoming an increasingly important mode of video playout, and consumers want to view content smoothly in reverse. The present invention seeks to provide an improved method of preparing a stream which has been arranged to assist trick mode playback in reverse.

There is thus provided in accordance with a preferred embodiment of the present invention a method for producing an auxiliary video stream arranged for reverse trick mode playback from a video stream including a plurality of uni-directional predicted frames, the method including producing the auxiliary video stream by performing the following steps copying each uni-directional predicted frame included in the video stream into a memory, thereby producing a plurality of copied frames in the memory, replacing each one of the plurality of copied frames with one corresponding supplemental frame, thereby producing a plurality of corresponding supplemental frames, and producing a copy of the video stream arranged in reverse processing order, the producing a copy including replacing each frame which corresponds to one of the plurality of copied frames with the one corresponding supplemental frame from among the plurality of corresponding supplemental frames.

Further in accordance with a preferred embodiment of the present invention, the method is performed at a video encoder.

Still further in accordance with a preferred embodiment of the present invention, the video encoder includes an MPEG-2 video encoder.

Additionally in accordance with a preferred embodiment of the present invention, the video encoder includes an MPEG-4 part 2 video encoder.

Moreover in accordance with a preferred embodiment of the present invention, the video encoder includes an MPEG-4 part 10 video encoder.

Further in accordance with a preferred embodiment of the present invention, the video encoder includes a VC-1 video encoder.

Still further in accordance with a preferred embodiment of the present invention, the method is performed at a video receiver.

Additionally in accordance with a preferred embodiment of the present invention, the video receiver includes a personal video recorder (PVR).

Moreover in accordance with a preferred embodiment of the present invention, the video receiver includes a DVD recorder.

Further in accordance with a preferred embodiment of the present invention, the video receiver records the auxiliary video stream.

Still further in accordance with a preferred embodiment of the present invention, the video receiver records the auxiliary video stream as an encrypted stream.

Additionally in accordance with a preferred embodiment of the present invention, the video receiver records the video stream.

Moreover in accordance with a preferred embodiment of the present invention, the plurality of uni-directional predicted frames includes a plurality of P-frames.

Further in accordance with a preferred embodiment of the present invention, the plurality of supplemental frames includes a plurality of P-frames.

Still further in accordance with a preferred embodiment of the present invention, the plurality of supplemental frames includes a plurality of I-frames.

Additionally in accordance with a preferred embodiment of the present invention, the plurality of supplemental frames includes a combination of at least one P-frame, and at least one I-frame.

Moreover in accordance with a preferred embodiment of the present invention, the method also includes associating each one of the plurality of supplemental frames with a corresponding uni-directional predicted frame in the video stream.

Further in accordance with a preferred embodiment of the present invention, the associating includes stamping each one of the plurality of supplemental frames with a presentation time stamp (PTS) identical to a PTS associated with the corresponding frame.

There is also provided in accordance with another preferred embodiment of the present invention a method for trick mode smooth rewind at a receiver, the method including receiving a broadcast video stream, performing at least one of receiving an auxiliary video stream, and producing, from the video stream, an auxiliary video stream, and rendering the auxiliary video stream palpable to at least one human sense, wherein the auxiliary video stream includes a video stream arranged to assist reverse trick mode playback, when the auxiliary video stream is processed.

There is also provided in accordance with still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at a video receiver copying at least some of the unidirectional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream.

Further in accordance with a preferred embodiment of the present invention the video encoder includes an MPEG-2 video encoder.

Still further in accordance with a preferred embodiment of the present invention the video encoder includes an MPEG-4 part 2 video encoder.

Additionally in accordance with a preferred embodiment of the present invention the video encoder includes an MPEG-4 part 10 video encoder.

Moreover in accordance with a preferred embodiment of the present invention the video encoder includes a VC-1 video encoder.

Further in accordance with a preferred embodiment of the present invention the video receiver includes a personal video recorder (PVR).

Still further in accordance with a preferred embodiment of the present invention the PVR records the auxiliary video stream.

Additionally in accordance with a preferred embodiment of the present invention the PVR records the auxiliary video stream as an encrypted stream.

Moreover in accordance with a preferred embodiment of the present invention the PVR records the video stream.

Further in accordance with a preferred embodiment of the present invention the PVR records the video stream as an encrypted stream.

Still further in accordance with a preferred embodiment of the present invention the encrypted stream is recorded with original broadcast encryption.

Additionally in accordance with a preferred embodiment of the present invention the video receiver includes a DVD recorder.

Moreover in accordance with a preferred embodiment of the present invention the DVD recorder records the auxiliary video stream.

Further in accordance with a preferred embodiment of the present invention the DVD recorder records the auxiliary video stream as an encrypted stream.

Still further in accordance with a preferred embodiment of the present invention the DVD recorder records the video stream.

Additionally in accordance with a preferred embodiment of the present invention the DVD recorder records the video stream as an encrypted stream.

Moreover in accordance with a preferred embodiment of the present invention the encrypted stream is recorded with original broadcast encryption.

Further in accordance with a preferred embodiment of the present invention the first set of supplemental frames includes a plurality of P-frames.

Still further in accordance with a preferred embodiment of the present invention the second set of supplemental frames includes a plurality of P-frames.

Additionally in accordance with a preferred embodiment of the present invention the first set of supplemental frames includes a plurality of I-frames.

Moreover in accordance with a preferred embodiment of the present invention the second set of supplemental frames includes a plurality of I-frames.

Further in accordance with a preferred embodiment of the present invention the first set of supplemental frames includes combination of at least one P-frame, and at least one I-frame.

Still further in accordance with a preferred embodiment of the present invention the second set of supplemental frames includes combination of at least one P-frame, and at least one I-frame.

Additionally in accordance with a preferred embodiment of the present invention the method also includes associating each one of the first set of supplemental frames with a corresponding uni-directional predicted frame in the video stream.

Moreover in accordance with a preferred embodiment of the present invention the associating includes stamping each one of the first set of supplemental frames with a presentation time stamp (PTS) identical to a PTS associated with the corresponding frame.

Further in accordance with a preferred embodiment of the present invention the method also includes associating each one of the second set of supplemental frames with a corresponding uni-directional predicted frame in the video stream.

Still further in accordance with a preferred embodiment of the present invention the associating includes stamping each one of the second set of supplemental frames with a presentation time stamp (PTS) identical to a PTS associated with the corresponding frame.

There is also provided in accordance with still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames.

Further in accordance with a preferred embodiment of the present invention the replacing includes replacing with individual supplemental frames selected from the plurality of supplemental frames included in the secondary video stream Still further in accordance with a preferred embodiment of the present invention the secondary video stream includes a video stream received from a broadcaster.

Additionally in accordance with a preferred embodiment of the present invention the secondary video stream includes a video stream received from a networked server.

Moreover in accordance with a preferred embodiment of the present invention the secondary video stream includes a video stream received from a DVD disk.

Further in accordance with a preferred embodiment of the present invention the video receiver includes a personal video recorder (PVR).

Still further in accordance with a preferred embodiment of the present invention the PVR records the auxiliary video stream.

Additionally in accordance with a preferred embodiment of the present invention the PVR records the auxiliary video stream as an encrypted stream.

Moreover in accordance with a preferred embodiment of the present invention the PVR records the video stream.

Further in accordance with a preferred embodiment of the present invention the PVR records the video stream as an encrypted stream.

Still further in accordance with a preferred embodiment of the present invention the encrypted stream is recorded with original broadcast encryption.

Additionally in accordance with a preferred embodiment of the present invention the plurality of uni-directional predicted frames includes a plurality of P-frames.

Moreover in accordance with a preferred embodiment of the present invention the video receiver includes a DVD recorder.

Further in accordance with a preferred embodiment of the present invention the DVD recorder records the auxiliary video stream.

Still further in accordance with a preferred embodiment of the present invention the DVD recorder records the auxiliary video stream as an encrypted stream.

Additionally in accordance with a preferred embodiment of the present invention the DVD recorder records the video stream.

Moreover in accordance with a preferred embodiment of the present invention the DVD recorder records the video stream as an encrypted stream.

Further in accordance with a preferred embodiment of the present invention the encrypted stream is recorded with original broadcast encryption.

Still further in accordance with a preferred embodiment of the present invention the plurality of supplemental frames includes a plurality of P-frames.

Additionally in accordance with a preferred embodiment of the present invention the plurality of supplemental frames includes a plurality of I-frames.

Moreover in accordance with a preferred embodiment of the present invention the plurality of supplemental frames includes combination of at least one P-frame, and at least one I-frame.

Further in accordance with a preferred embodiment of the present invention the method also includes associating each one of the plurality of supplemental frames with a corresponding uni-directional predicted frame in the video stream.

Still further in accordance with a preferred embodiment of the present invention the associating includes stamping each one of the plurality of supplemental frames with a presentation time stamp (PTS) identical to a PTS associated with the corresponding frame.

Additionally in accordance with a preferred embodiment of the present invention the producing the auxiliary video stream is performed on demand.

There is also provided in accordance with still another preferred embodiment of the present invention at a video receiver, a method for producing a video playback stream arranged to assist reverse trick mode playback, the method including receiving a broadcast video stream, video decoding the broadcast video stream, selecting a uni-directional predicted frame from the broadcast video stream, the uni-directional frame including a last uni-directional frame in a first group of pictures (GOP), creating a substitute frame for the selected uni-directional frame, the substitute frame based on an initial key frame included in a next GOP, creating a plurality of substitute frames for a plurality of uni-directional frames included in the first GOP, each substitute frame of the plurality of substitute frames corresponding to one uni-directional frame included in the first GOP, the creating being based on a preceding uni-directional frame, stamping each substitute frame with a presentation time stamp (PTS), the PTS being identical to a PTS associated with the corresponding one P-frame for each substitute frame, and recording a video stream including the plurality of substitute frames arranged in reverse processing order.

Further in accordance with a preferred embodiment of the present invention the uni-directional predicted frame includes a P-frame.

Still further in accordance with a preferred embodiment of the present invention the broadcast video stream includes an encrypted video stream.

Additionally in accordance with a preferred embodiment of the present invention the method further includes decrypting the broadcast video stream.

Moreover in accordance with a preferred embodiment of the present invention the broadcast video stream is recorded by the video receiver.

Further in accordance with a preferred embodiment of the present invention the broadcast stream is recording with original broadcast encryption.

Still further in accordance with a preferred embodiment of the present invention the recording the plurality of substitute frames includes first locally encrypting the plurality of substitute frames before recording.

Additionally in accordance with a preferred embodiment of the present invention the plurality of uni-directional frames included in the first GOP does not include the selected uni-directional frame.

Moreover in accordance with a preferred embodiment of the present invention the video receiver includes a personal video recorder (PVR).

Further in accordance with a preferred embodiment of the present invention the decrypting includes secure decryption.

Still further in accordance with a preferred embodiment of the present invention the steps of creating a substitute frame and creating a plurality of substitute frames include secure creating steps.

Additionally in accordance with a preferred embodiment of the present invention wherein the decryption and the creating steps occur in a single integrated circuit.

Moreover in accordance with a preferred embodiment of the present invention the substitute frame includes a P-frame.

Further in accordance with a preferred embodiment of the present invention the substitute frame includes an I-frame.

There is also provided in accordance with still another preferred embodiment of the present invention a method for generating an auxiliary video stream for reverse trick mode play, the method including providing a primary video stream including at least one group of pictures, the group of pictures commencing with a first key frame and terminating with a frame immediately preceding a second key frame, the group of pictures further including at least one uni-directional predicted frame and a plurality of bi-directional predicted frames, predicting, on the basis of the second key frame, a substitute frame, and creating the auxiliary video stream by performing the following substituting the at least one uni-directional predicted frame with the substitute frame, for each additional uni-directional predicted frame in the primary video stream, predicting, on the basis of a following uni-directional predicted frame, a corresponding substitute frame, and substituting each additional uni-directional predicted frame with the corresponding substitute frame, thereby creating an auxiliary video stream for reverse trick mode play.

Further in accordance with a preferred embodiment of the present invention the substitute frame includes a P-frame.

Still further in accordance with a preferred embodiment of the present invention the substitute frame includes an I-frame.

Additionally in accordance with a preferred embodiment of the present invention the auxiliary video stream includes an MPEG-2 video stream.

Moreover in accordance with a preferred embodiment of the present invention the auxiliary video stream includes an MPEG-4 part 2 video stream.

Further in accordance with a preferred embodiment of the present invention the auxiliary video stream includes an MPEG-4 part 10 video stream.

Still further in accordance with a preferred embodiment of the present invention the auxiliary video stream includes a VC-1 video stream.

There is also provided in accordance with still another preferred embodiment of the present invention an auxiliary video stream including at least one group of pictures (GOP), the auxiliary video stream corresponding to a primary video stream, the auxiliary video stream including a key frame including the initial frame in a GOP in the primary video stream in forward presentation order, a plurality of uni-directional predicted frames, the frames included in the plurality of uni-directional predicted frames including substitute uni-directional predicted frames, each substitute uni-directional predicted frame being associated with a presentation time stamp (PTS) identical to a PTS associated with a corresponding uni-directional predicted frame in the corresponding primary video stream, and a plurality of bi-directional predicted frames, wherein the GOP in the auxiliary video stream includes a GOP arranged in reverse processing order.

Further in accordance with a preferred embodiment of the present invention the key frame includes an I-frame.

Still further in accordance with a preferred embodiment of the present invention the key frame includes an IDR-frame.

Additionally in accordance with a preferred embodiment of the present invention the predicted frame includes a P-frame.

Moreover in accordance with a preferred embodiment of the present invention the predicted frame includes an B-frame.

Further in accordance with a preferred embodiment of the present invention the bi-directional predicted frame includes a B-frame.

Still Further in accordance with a preferred embodiment of the present invention a DVD disk including the auxiliary video stream.

Additionally in accordance with a preferred embodiment of the present invention a broadcast stream including the auxiliary video stream.

Moreover in accordance with a preferred embodiment of the present invention a video stream recorded on a hard disk drive, the video stream including the auxiliary video stream.

There is also provided in accordance with still another preferred embodiment of the present invention a method for generating at least one frame for assisting smooth play reverse trick mode, the method including producing a uni-directional predicted frame for a group of pictures, the uni-directional predicted based on at least one of a next uni-directional predicted frame in forward processing order, and a next key frame in forward processing order, and producing the uni-directional predicted frame at an appropriate time, the appropriate time being determined according to an availability of a source frame with which the uni-directional predicted frame is associated.

Further in accordance with a preferred embodiment of the present invention the producing occurs at a video encoder.

Still further in accordance with a preferred embodiment of the present invention the video encoder includes an MPEG-2 video encoder.

Additionally in accordance with a preferred embodiment of the present invention the video encoder includes an MPEG-4 part 2 video encoder.

Moreover in accordance with a preferred embodiment of the present invention the video encoder includes an MPEG-4 part 10 video encoder.

Further in accordance with a preferred embodiment of the present invention the video encoder includes a VC-1 video encoder.

Still further in accordance with a preferred embodiment of the present invention the method is performed at a video receiver.

Additionally in accordance with a preferred embodiment of the present invention the video receiver includes a personal video recorder (PVR).

Moreover in accordance with a preferred embodiment of the present invention the video receiver includes a DVD recorder.

Further in accordance with a preferred embodiment of the present invention the video receiver includes a DVD player.

Still further in accordance with a preferred embodiment of the present invention the produced uni-directional predicted frame includes a P-frame.

Additionally in accordance with a preferred embodiment of the present invention the produced uni-directional predicted frame includes an I-frame.

Moreover in accordance with a preferred embodiment of the present invention the source frame includes an I-frame.

Further in accordance with a preferred embodiment of the present invention the source frame includes a P-frame.

There is also provided in accordance with a still another preferred embodiment of the present invention a method for producing an auxiliary video stream arranged for reverse trick mode playback from a video stream including a plurality of uni-directional predicted frames, the method including producing the auxiliary video stream by performing the following steps copying each uni-directional predicted frame included in the video stream into a memory, thereby producing a plurality of copied frames in the memory, replacing each one of the plurality of copied frames with one corresponding supplemental frame, thereby producing a plurality of corresponding supplemental frames, and producing a copy of the video stream arranged in reverse processing order, the producing a copy including replacing each frame which corresponds to one of the plurality of copied frames with the one corresponding supplemental frame from among the plurality of corresponding supplemental frames, wherein the method is performed at a video encoder.

There is also provided in accordance with a still another preferred embodiment of the present invention a method for producing an auxiliary video stream arranged for reverse trick mode playback from a video stream including a plurality of uni-directional predicted frames, the method including producing the auxiliary video stream by performing the following steps copying each uni-directional predicted frame included in the video stream into a memory, thereby producing a plurality of copied frames in the memory, replacing each one of the plurality of copied frames with one corresponding supplemental frame, thereby producing a plurality of corresponding supplemental frames, and producing a copy of the video stream arranged in reverse processing order, the producing a copy including replacing each frame which corresponds to one of the plurality of copied frames with the one corresponding supplemental frame from among the plurality of corresponding supplemental frames, wherein the method is performed at a video receiver.

There is also provided in accordance with a still another preferred embodiment of the present invention a method for producing an auxiliary video stream arranged for reverse trick mode playback from a video stream including a plurality of uni-directional predicted frames, the method including producing the auxiliary video stream by performing the following steps copying each uni-directional predicted frame included in the video stream into a memory, thereby producing a plurality of copied frames in the memory, replacing each one of the plurality of copied frames with one corresponding supplemental frame, thereby producing a plurality of corresponding supplemental frames, and producing a copy of the video stream arranged in reverse processing order, the producing a copy including replacing each frame which corresponds to one of the plurality of copied frames with the one corresponding supplemental frame from among the plurality of corresponding supplemental frames, wherein the plurality of supplemental frames includes a plurality of P-frames.

There is also provided in accordance with a still another preferred embodiment of the present invention a method for producing an auxiliary video stream arranged for reverse trick mode playback from a video stream including a plurality of uni-directional predicted frames, the method including producing the auxiliary video stream by performing the following steps copying each uni-directional predicted frame included in the video stream into a memory, thereby producing a plurality of copied frames in the memory, replacing each one of the plurality of copied frames with one corresponding supplemental frame, thereby producing a plurality of corresponding supplemental frames, and producing a copy of the video stream arranged in reverse processing order, the producing a copy including replacing each frame which corresponds to one of the plurality of copied frames with the one corresponding supplemental frame from among the plurality of corresponding supplemental frames, wherein the plurality of supplemental frames includes a plurality of I-frames.

There is also provided in accordance with a still another preferred embodiment of the present invention a method for producing an auxiliary video stream arranged for reverse trick mode playback from a video stream including a plurality of uni-directional predicted frames, the method including producing the auxiliary video stream by performing the following steps copying each uni-directional predicted frame included in the video stream into a memory, thereby producing a plurality of copied frames in the memory, replacing each one of the plurality of copied frames with one corresponding supplemental frame, thereby producing a plurality of corresponding supplemental frames, and producing a copy of the video stream arranged in reverse processing order, the producing a copy including replacing each frame which corresponds to one of the plurality of copied frames with the one corresponding supplemental frame from among the plurality of corresponding supplemental frames, wherein the plurality of supplemental frames includes a combination of at least one P-frame, and at least one I-frame.

There is also provided in accordance with a still another preferred embodiment of the present invention a method for producing an auxiliary video stream arranged for reverse trick mode playback from a video stream including a plurality of uni-directional predicted frames, the method including producing the auxiliary video stream by performing the following steps copying each uni-directional predicted frame included in the video stream into a memory, thereby producing a plurality of copied frames in the memory, replacing each one of the plurality of copied frames with one corresponding supplemental frame, thereby producing a plurality of corresponding supplemental frames, producing a copy of the video stream arranged in reverse processing order, the producing a copy including replacing each frame which corresponds to one of the plurality of copied frames with the one corresponding supplemental frame from among the plurality of corresponding supplemental frames, and associating each one of the plurality of supplemental frames with a corresponding uni-directional predicted frame in the video stream, wherein the associating includes stamping each one of the plurality of supplemental frames with a presentation time stamp (PTS) identical to a PTS associated with the corresponding frame.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, and the first set of corresponding supplemental frames includes a plurality of P-frames.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, and the second set of corresponding supplemental frames includes a plurality of P-frames.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, the first set of corresponding supplemental frames includes a plurality of P-frames, and the second set of corresponding supplemental frames includes a plurality of P-frames.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, and the first set of supplemental frames includes a plurality of I-frames.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, and the second set of supplemental frames includes a plurality of I-frames.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, the first set of supplemental frames includes a plurality of I-frames, and the second set of supplemental frames includes a plurality of I-frames.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, and the first set of supplemental frames includes combination of at least one P-frame, and at least one I-frame.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, and the second set of supplemental frames includes combination of at least one P-frame, and at least one I-frame.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, the first set of supplemental frames includes combination of at least one P-frame, and at least one I-frame, and the second set of supplemental frames includes combination of at least one P-frame, and at least one I-frame.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, associating each one of the first set of supplemental frames with a corresponding uni-directional predicted frame in the video stream, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, and producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream, and the associating includes stamping each one of the plurality of supplemental frames with a presentation time stamp (PTS) identical to a PTS associated with the corresponding frame.

There is also provided in accordance with a still another preferred embodiment of the present invention a method for producing an auxiliary video stream arranged for reverse trick mode playback from a video stream including a plurality of uni-directional predicted frames, the method being performed at least partly at a video encoder and at least partly at a video receiver, the method including creating a first auxiliary video stream including a first set of supplemental frames by performing the following at a video encoder copying at least some of the uni-directional predicted frames included in the video stream into a first memory, thereby producing a first plurality of copied frames in the first memory, replacing each one of the first plurality of copied frames with one corresponding supplemental frame, thereby producing a first plurality of corresponding supplemental frames, and producing the first auxiliary video stream, the first auxiliary video stream being arranged in reverse processing order, the producing the first auxiliary video stream including replacing each frame which corresponds to one of the first plurality of copied frames with the one corresponding supplemental frame from among the first plurality of corresponding supplemental frames, and creating a second auxiliary video stream including a second set of supplemental frames by performing the following at video receiver copying at least some of the uni-directional predicted frames included in the video stream into a second memory, thereby producing a second plurality of copied frames in the second memory, replacing each one of the second plurality of copied frames with one corresponding supplemental frame, thereby producing a second plurality of corresponding supplemental frames, producing the second auxiliary video stream, the second auxiliary video stream being arranged in reverse processing order, the producing the second auxiliary video stream including replacing each frame which corresponds to one of the second plurality of copied frames with the one corresponding supplemental frame from among the second plurality of corresponding supplemental frames, and associating each one of the second set of supplemental frames with a corresponding uni-directional predicted frame in the video stream, wherein the first auxiliary video stream and the second auxiliary video stream include mutually complementary video streams, such that the auxiliary video stream includes a union of the first auxiliary video stream and the second auxiliary video stream, and the associating includes stamping each one of the plurality of supplemental frames with a presentation time stamp (PTS) identical to a PTS associated with the corresponding frame.

There is also provided in accordance with a still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames, wherein the replacing includes replacing with individual supplemental frames selected from the plurality of supplemental frames included in the secondary video stream.

There is also provided in accordance with a still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames, wherein the secondary video stream includes a video stream received from a broadcaster.

There is also provided in accordance with a still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames, wherein the secondary video stream includes a video stream received from a DVD disk.

There is also provided in accordance with a still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames, wherein the plurality of supplemental frames includes a plurality of P-frames.

There is also provided in accordance with a still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames, wherein the plurality of supplemental frames includes a plurality of I-frames.

There is also provided in accordance with a still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames, wherein the plurality of supplemental frames includes combination of at least one P-frame, and at least one I-frame.

There is also provided in accordance with a still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames, wherein the associating includes stamping each one of the plurality of supplemental frames with a presentation time stamp (PTS) identical to a PTS associated with the corresponding frame.

There is also provided in accordance with a still another preferred embodiment of the present invention a method performed at a video recorder for producing an auxiliary video stream arranged for reverse trick mode playback from a video stream including a plurality of uni-directional predicted frames, the method including receiving a broadcast secondary video stream associated with the video stream, the broadcast secondary video stream including a plurality of supplemental frames, producing the auxiliary video stream by performing the following steps copying the plurality of supplemental frames into a memory, and producing a copy of the video stream arranged in reverse processing order, the producing including replacing each frame which corresponds to one of the plurality of copied frames with the one corresponding supplemental frame from among the plurality of corresponding supplemental frames, wherein the producing the auxiliary video stream is performed on demand.

There is also provided in accordance with a still another preferred embodiment of the present invention at a video receiver, a method for producing a video playback stream arranged to assist reverse trick mode playback, the method including receiving a broadcast video stream, video decoding the broadcast video stream, selecting a uni-directional predicted frame from the broadcast video stream, the uni-directional frame including a last uni-directional frame in a first group of pictures (GOP), creating a substitute frame for the selected uni-directional frame, the substitute frame based on an initial key frame included in a next GOP, creating a plurality of substitute frames for a plurality of uni-directional frames included in the first GOP, each substitute frame of the plurality of substitute frames corresponding to one uni-directional frame included in the first GOP, the creating being based on a preceding uni-directional frame, stamping each substitute frame with a presentation time stamp (PTS), the PTS being identical to a PTS associated with the corresponding one P-frame for each substitute frame, and recording a video stream including the plurality of substitute frames arranged in reverse processing order, wherein the uni-directional predicted frame includes a P-frame.

There is also provided in accordance with a still another preferred embodiment of the present invention at a video receiver, a method for producing a video playback stream arranged to assist reverse trick mode playback, the method including receiving a broadcast video stream, video decoding the broadcast video stream, selecting a uni-directional predicted frame from the broadcast video stream, the uni-directional frame including a last uni-directional frame in a first group of pictures (GOP), creating a substitute frame for the selected uni-directional frame, the substitute frame based on an initial key frame included in a next GOP, creating a plurality of substitute frames for a plurality of uni-directional frames included in the first GOP, each substitute frame of the plurality of substitute frames corresponding to one uni-directional frame included in the first GOP, the creating being based on a preceding uni-directional frame, stamping each substitute frame with a presentation time stamp (PTS), the PTS being identical to a PTS associated with the corresponding one P-frame for each substitute frame, and recording a video stream including the plurality of substitute frames arranged in reverse processing order, wherein the substitute frame includes a P-frame.

There is also provided in accordance with a still another preferred embodiment of the present invention at a video receiver, a method for producing a video playback stream arranged to assist reverse trick mode playback, the method including receiving a broadcast video stream, video decoding the broadcast video stream, selecting a uni-directional predicted frame from the broadcast video stream, the uni-directional frame including a last uni-directional frame in a first group of pictures (GOP), creating a substitute frame for the selected uni-directional frame, the substitute frame based on an initial key frame included in a next GOP, creating a plurality of substitute frames for a plurality of uni-directional frames included in the first GOP, each substitute frame of the plurality of substitute frames corresponding to one uni-directional frame included in the first GOP, the creating being based on a preceding uni-directional frame, stamping each substitute frame with a presentation time stamp (PTS), the PTS being identical to a PTS associated with the corresponding one P-frame for each substitute frame, and recording a video stream including the plurality of substitute frames arranged in reverse processing order, wherein the substitute frame includes an I-frame.

There is also provided in accordance with a still another preferred embodiment of the present invention a method for generating an auxiliary video stream for reverse trick mode play, the method including providing a primary video stream including at least one group of pictures, the group of pictures commencing with a first key frame and terminating with a frame immediately preceding a second key frame, the group of pictures further including at least one uni-directional predicted frame and a plurality of bi-directional predicted frames, predicting, on the basis of the second key frame, a substitute frame, and creating the auxiliary video stream by performing the following substituting the at least one uni-directional predicted frame with the substitute frame, for each additional uni-directional predicted frame in the primary video stream, predicting, on the basis of a following uni-directional predicted frame, a corresponding substitute frame, and substituting each additional uni-directional predicted frame with the corresponding substitute frame, thereby creating an auxiliary video stream for reverse trick mode play, wherein the substitute frame includes a P-frame.

There is also provided in accordance with a still another preferred embodiment of the present invention a method for generating an auxiliary video stream for reverse trick mode play, the method including providing a primary video stream including at least one group of pictures, the group of pictures commencing with a first key frame and terminating with a frame immediately preceding a second key frame, the group of pictures further including at least one uni-directional predicted frame and a plurality of bi-directional predicted frames, predicting, on the basis of the second key frame, a substitute frame, and creating the auxiliary video stream by performing the following substituting the at least one uni-directional predicted frame with the substitute frame, for each additional uni-directional predicted frame in the primary video stream, predicting, on the basis of a following uni-directional predicted frame, a corresponding substitute frame, and substituting each additional uni-directional predicted frame with the corresponding substitute frame, thereby creating an auxiliary video stream for reverse trick mode play, wherein the substitute frame includes an I-frame.

There is also provided in accordance with a still another preferred embodiment of the present invention an auxiliary video stream including at least one group of pictures (GOP), the auxiliary video stream corresponding to a primary video stream, the auxiliary video stream including a key frame including the initial frame in a GOP in the primary video stream in forward presentation order, a plurality of uni-directional predicted frames, the frames included in the plurality of uni-directional predicted frames including substitute uni-directional predicted frames, each substitute uni-directional predicted frame being associated with a presentation time stamp (PTS) identical to a PTS associated with a corresponding uni-directional predicted frame in the corresponding primary video stream, and a plurality of bi-directional predicted frames, wherein the GOP in the auxiliary video stream includes a GOP arranged in reverse processing order and the key frame includes an I-frame.

There is also provided in accordance with a still another preferred embodiment of the present invention an auxiliary video stream including at least one group of pictures (GOP), the auxiliary video stream corresponding to a primary video stream, the auxiliary video stream including a key frame including the initial frame in a GOP in the primary video stream in forward presentation order, a plurality of uni-directional predicted frames, the frames included in the plurality of uni-directional predicted frames including substitute uni-directional predicted frames, each substitute uni-directional predicted frame being associated with a presentation time stamp (PTS) identical to a PTS associated with a corresponding uni-directional predicted frame in the corresponding primary video stream, and a plurality of bi-directional predicted frames, wherein the GOP in the auxiliary video stream includes a GOP arranged in reverse processing order, and the key frame includes an IDR-frame.

There is also provided in accordance with a still another preferred embodiment of the present invention an auxiliary video stream including at least one group of pictures (GOP), the auxiliary video stream corresponding to a primary video stream the auxiliary video stream including a key frame including the initial frame in a GOP in the primary video stream in forward presentation order, a plurality of uni-directional predicted frames, the frames included in the plurality of uni-directional predicted frames including substitute uni-directional predicted frames, each substitute uni-directional predicted frame being associated with a presentation time stamp (PTS) identical to a PTS associated with a corresponding uni-directional predicted frame in the corresponding primary video stream, and a plurality of bi-directional predicted frames, wherein the GOP in the auxiliary video stream includes a GOP arranged in reverse processing order and the predicted frame includes a P-frame.

There is also provided in accordance with a still another preferred embodiment of the present invention an auxiliary video stream including at least one group of pictures (GOP), the auxiliary video stream corresponding to a primary video stream, the auxiliary video stream including a key frame including the initial frame in a GOP in the primary video stream in forward presentation order, a plurality of uni-directional predicted frames, the frames included in the plurality of uni-directional predicted frames including substitute uni-directional predicted frames, each substitute uni-directional predicted frame being associated with a presentation time stamp (PTS) identical to a PTS associated with a corresponding uni-directional predicted frame in the corresponding primary video stream, and a plurality of bi-directional predicted frames, wherein the GOP in the auxiliary video stream includes a GOP arranged in reverse processing order, the predicted frame includes an I-frame.

There is also provided in accordance with a still another preferred embodiment of the present invention an auxiliary video stream including at least one group of pictures (GOP), the auxiliary video stream corresponding to a primary video stream, the auxiliary video stream including a key frame including the initial frame in a GOP in the primary video stream in forward presentation order, a plurality of uni-directional predicted frames, the frames included in the plurality of uni-directional predicted frames including substitute uni-directional predicted frames, each substitute uni-directional predicted frame being associated with a presentation time stamp (PTS) identical to a PTS associated with a corresponding uni-directional predicted frame in the corresponding primary video stream, and a plurality of bi-directional predicted frames, wherein the GOP in the auxiliary video stream includes a GOP arranged in reverse processing order and the bi-directional predicted frame includes a B-frame.

There is also provided in accordance with a still another preferred embodiment of the present invention a DVD disk including the auxiliary video stream including an auxiliary video stream including at least one group of pictures (GOP), the auxiliary video stream corresponding to a primary video stream, the auxiliary video stream including a key frame including the initial frame in a GOP in the primary video stream in forward presentation order, a plurality of uni-directional predicted frames, the frames included in the plurality of uni-directional predicted frames including substitute uni-directional predicted frames, each substitute uni-directional predicted frame being associated with a presentation time stamp (PTS) identical to a PTS associated with a corresponding uni-directional predicted frame in the corresponding primary video stream, and a plurality of bi-directional predicted frames, wherein the GOP in the auxiliary video stream includes a GOP arranged in reverse processing order.

There is also provided in accordance with a still another preferred embodiment of the present invention a method for generating at least one frame for assisting smooth play reverse trick mode, the method including producing a uni-directional predicted frame for a group of pictures, the uni-directional predicted based on at least one of a next uni-directional predicted frame in forward processing order, and a next key frame in forward processing order, and producing the uni-directional predicted frame at an appropriate time, the appropriate time being determined according to an availability of a source frame with which the uni-directional predicted frame is associated, wherein the producing occurs at a video encoder.

There is also provided in accordance with a still another preferred embodiment of the present invention a method for generating at least one frame for assisting smooth play reverse trick mode, the method including producing a uni-directional predicted frame for a group of pictures, the uni-directional predicted based on at least one of a next uni-directional predicted frame in forward processing order, and a next key frame in forward processing order, and producing the uni-directional predicted frame at an appropriate time, the appropriate time being determined according to an availability of a source frame with which the uni-directional predicted frame is associated, wherein the method is performed at a video receiver.

There is also provided in accordance with a still another preferred embodiment of the present invention a method for generating at least one frame for assisting smooth play reverse trick mode, the method including producing a uni-directional predicted frame for a group of pictures, the uni-directional predicted based on at least one of a next uni-directional predicted frame in forward processing order, and a next key frame in forward processing order, and producing the uni-directional predicted frame at an appropriate time, the appropriate time being determined according to an availability of a source frame with which the uni-directional predicted frame is associated, wherein the produced uni-directional predicted frame includes a P-frame.

There is also provided in accordance with a still another preferred embodiment of the present invention a method for generating at least one frame for assisting smooth play reverse trick mode, the method including producing a uni-directional predicted frame for a group of pictures, the uni-directional predicted based on at least one of a next uni-directional predicted frame in forward processing order, and a next key frame in forward processing order, and producing the uni-directional predicted frame at an appropriate time, the appropriate time being determined according to an availability of a source frame with which the uni-directional predicted frame is associated, wherein the produced uni-directional predicted frame includes an I-frame.

There is also provided in accordance with a still another preferred embodiment of the present invention a method for generating at least one frame for assisting smooth play reverse trick mode, the method including producing a uni-directional predicted frame for a group of pictures, the uni-directional predicted based on at least one of a next uni-directional predicted frame in forward processing order, and a next key frame in forward processing order, and producing the uni-directional predicted frame at an appropriate time, the appropriate time being determined according to an availability of a source frame with which the uni-directional predicted frame is associated, wherein the source frame includes an I-frame.

There is also provided in accordance with a still another preferred embodiment of the present invention a method for generating at least one frame for assisting smooth play reverse trick mode, the method including producing a uni-directional predicted frame for a group of pictures, the uni-directional predicted based on at least one of a next uni-directional predicted frame in forward processing order, and a next key frame in forward processing order, and producing the uni-directional predicted frame at an appropriate time, the appropriate time being determined according to an availability of a source frame with which the uni-directional predicted frame is associated, wherein the source frame includes a P-frame.

There is also provided in accordance with a still another preferred embodiment of the present invention a system for producing an auxiliary video stream arranged for reverse trick mode playback from a video stream including a plurality of uni-directional predicted frames, the system including a video producer operative to produce the auxiliary video stream, the video producer including a frame copier operative to copy each uni-directional predicted frame included in the video stream into a memory, thereby producing a plurality of copied frames in the memory, a frame replacer operative to replace each one of the plurality of copied frames with one corresponding supplemental frame, thereby producing a plurality of corresponding supplemental frames, and a video stream producer operative to produce a copy of the video stream arranged in reverse processing order, the producing a copy including replacing each frame which corresponds to one of the plurality of copied frames with the one corresponding supplemental frame from among the plurality of corresponding supplemental frames.

There is also provided in accordance with a still another preferred embodiment of the present invention a system for trick mode smooth rewind at a receiver, the system including a receiver operative to receive a broadcast video stream, the receiver including at least one of an auxiliary stream receiver operative to receive an auxiliary video stream, and an auxiliary stream producer operative to produce, from the video stream, an auxiliary video stream, and a rendering unit, operative to render the auxiliary video stream palpable to at least one human sense, wherein the auxiliary video stream includes a video stream arranged to assist reverse trick mode playback, when the auxiliary video stream is processed.

There is also provided in accordance with a still another preferred embodiment of the present invention a system for producing an auxiliary video stream arranged for reverse trick mode playback from a video stream including a plurality of uni-directional predicted frames, the system being disposed at least partly at a video encoder and at least partly at a video receiver, the system including a first auxiliary video stream creator operative to create a first auxiliary video stream, the first auxiliary video stream including a first set of supplemental frames, the first auxiliary video stream creator being disposed in the video encoder, the first auxiliary video stream creator including a frame copier operative to copy at least some of the uni-directional predicted frames included in the video stream into a first memory, thereby producing a first plurality of copied frames in the first memory, a frame replacer operative to replace each one of the first plurality of copied frames with one corresponding supplemental frame, thereby producing a first plurality of corresponding supplemental frames, and a first auxiliary video stream producer operative to produce the first auxiliary video stream, the first auxiliary video stream being arranged in reverse processing order, the first auxiliary video stream producer being further operative to replace each frame which corresponds to one of the first plurality of copied frames with the one corresponding supplemental frame from among the first plurality of corresponding supplemental frames, and a second auxiliary video stream creator operative to create a second auxiliary video stream, the second auxiliary video stream including a second set of supplemental frames, the second auxiliary video stream creator being disposed in the video receiver, the second auxiliary video stream creator including a frame copier operative to copy at least some of the uni-directional predicted frames included in the video stream into a second memory, thereby producing a second plurality of copied frames in the second memory, a frame replacer operative to replace each one of the second plurality of copied frames with one corresponding supplemental frame, thereby producing a second plurality of corresponding supplemental frames, and a second auxiliary video stream producer operative to produce the second auxiliary video stream, the second auxiliary video stream being arranged in reverse processing order, the second auxiliary video stream producer being further operative to replace each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream.

There is also provided in accordance with a still another preferred embodiment of the present invention a system disposed at a video recorder for producing an auxiliary video stream arranged for reverse trick mode playback from a video stream including a plurality of uni-directional predicted frames, the system including a video stream receiver operative to receive a broadcast secondary video stream associated with the video stream, the broadcast secondary video stream including a plurality of supplemental frames, an auxiliary video stream producer operative to produce the auxiliary video stream, the auxiliary video stream producer including a frame copier operative to copy the plurality of supplemental frames into a memory, and a producer operative to produce a copy of the video stream arranged in reverse processing order, the producer being further operative to replace each frame which corresponds to one of the plurality of copied frames with the one corresponding supplemental frame from among the plurality of corresponding supplemental frames.

There is also provided in accordance with a still another preferred embodiment of the present invention at a video receiver, a system for producing a video playback stream arranged to assist reverse trick mode playback, the system including a broadcast video stream receiver operative to receive a broadcast video stream, a video decoder operative to decode the broadcast video stream, a frame selector operative to select a uni-directional predicted frame from the broadcast video stream, the uni-directional frame including a last uni-directional frame in a first group of pictures (GOP), a frame creator operative to create a substitute frame for the selected uni-directional frame, the substitute frame being based on an initial key frame included in a next GOP, the frame creator being further operative to create a plurality of substitute frames for a plurality of uni-directional frames included in the first GOP, each substitute frame of the plurality of substitute frames corresponding to one uni-directional frame included in the first GOP, the creating being based on a preceding uni-directional frame, a presentation time stamp stamping unit operative to stamp each substitute frame with a presentation time stamp (PTS), the PTS being identical to a PTS associated with the corresponding one P-frame for each substitute frame, and a video recorder operative to record a video stream, the video stream including the plurality of substitute frames arranged in reverse processing order.

There is also provided in accordance with a still another preferred embodiment of the present invention a system for generating an auxiliary video stream for reverse trick mode play, the system including a primary video stream provider operative to provide a primary video stream, the primary video stream including at least one group of pictures, the group of pictures commencing with a first key frame and terminating with a frame immediately preceding a second key frame, the group of pictures further including at least one uni-directional predicted frame and a plurality of bi-directional predicted frames, a frame predictor operative to predict, on the basis of the second key frame, a substitute frame, and an auxiliary video stream creator operative to create the auxiliary video stream, the auxiliary video stream creator including a frame substituter operative to substitute the at least one uni-directional predicted frame with the substitute frame, the frame predictor being further operative to predict, for each additional uni-directional predicted frame in the primary video stream, on the basis of a following uni-directional predicted frame, a corresponding substitute frame, and a frame substituter operative to substitute each additional uni-directional predicted frame with the corresponding substitute frame, thereby creating an auxiliary video stream for reverse trick mode play.

There is also provided in accordance with a still another preferred embodiment of the present invention a system for generating at least one frame for assisting smooth play reverse trick mode, the system including a frame producer operative to produce a uni-directional predicted frame for a group of pictures, the uni-directional predicted based on at least one of a next uni-directional predicted frame in forward processing order, and a next key frame in forward processing order, and the frame producer being further operative to produce the uni-directional predicted frame at an appropriate time, the appropriate time being determined according to an availability of a source frame with which the uni-directional predicted frame is associated.

There is also provided in accordance with a still another preferred embodiment of the present invention a system for producing an auxiliary video stream arranged for reverse trick mode playback from a video stream including a plurality of uni-directional predicted frames, the system including video producing means for producing the auxiliary video stream, the video producing means including frame copying means for copying each uni-directional predicted frame included in the video stream into a memory, thereby producing a plurality of copied frames in the memory, frame replacing means for replacing each one of the plurality of copied frames with one corresponding supplemental frame, thereby producing a plurality of corresponding supplemental frames, and video stream producing means for producing a copy of the video stream arranged in reverse processing order, the producing a copy including replacing each frame which corresponds to one of the plurality of copied frames with the one corresponding supplemental frame from among the plurality of corresponding supplemental frames.

There is also provided in accordance with a still another preferred embodiment of the present invention a system for trick mode smooth rewind at a receiver, the system including receiving means for receiving a broadcast video stream, the receiving means including at least one of auxiliary stream receiving means for receiving an auxiliary video stream, and auxiliary stream producing means for producing, from the video stream, an auxiliary video stream, and rendering means for rendering the auxiliary video stream palpable to at least one human sense, wherein the auxiliary video stream includes a video stream arranged to assist reverse trick mode playback, when the auxiliary video stream is processed.

There is also provided in accordance with a still another preferred embodiment of the present invention a system for producing an auxiliary video stream arranged for reverse trick mode playback from a video stream including a plurality of uni-directional predicted frames, the system being disposed at least partly at a video encoder and at least partly at a video receiver, the system including first auxiliary video stream creating means for creating a first auxiliary video stream, the first auxiliary video stream including a first set of supplemental frames, the first auxiliary video stream creating means being disposed in the video encoder, the first auxiliary video stream creating means including frame copying means for copying at least some of the uni-directional predicted frames included in the video stream into a first memory means, thereby producing a first plurality of copied frames in the first memory means, frame replacing means for replacing each one of the first plurality of copied frames with one corresponding supplemental frame, thereby producing a first plurality of corresponding supplemental frames, and first auxiliary video stream producing means for producing the first auxiliary video stream, the first auxiliary video stream being arranged in reverse processing order, the first auxiliary video stream producing means being further operative to replace each frame which corresponds to one of the first plurality of copied frames with the one corresponding supplemental frame from among the first plurality of corresponding supplemental frames, and second auxiliary video stream creating means for creating a second auxiliary video stream, the second auxiliary video stream including a second set of supplemental frames, the second auxiliary video stream creating means being disposed in the video receiver, the second auxiliary video stream creating means including frame copying means for copying at least some of the uni-directional predicted frames included in the video stream into a second memory means, thereby producing a second plurality of copied frames in the second memory means, frame replacing means for replacing each one of the second plurality of copied frames with one corresponding supplemental frames thereby producing a second plurality of corresponding supplemental frames, and second auxiliary video stream producing means for producing the second auxiliary video stream, the second auxiliary video stream being arranged in reverse processing order, the second auxiliary video stream producing means being further operative to replace each frame which corresponds to one of the second plurality of copied frames with the one corresponding supplemental frame from among the second plurality of corresponding supplemental frames, wherein the first auxiliary video stream and the second auxiliary video stream include mutually complementary video streams, such that the auxiliary video stream includes a union of the first auxiliary video stream and the second auxiliary video stream.

There is also provided in accordance with a still another preferred embodiment of the present invention a system disposed at a video recorder for producing an auxiliary video stream arranged for reverse trick mode playback from a video stream including a plurality of uni-directional predicted frames, the system including video stream receiving means for receiving a broadcast secondary video stream associated with the video stream, the broadcast secondary video stream including a plurality of supplemental frames, auxiliary video stream producing means for producing the auxiliary video stream, the auxiliary video stream producing means including frame copying means for copying the plurality of supplemental frames into a memory, and producing means for producing a copy of the video stream arranged in reverse processing order, the producing means being further operative to replace each frame which corresponds to one of the plurality of copied frames with the one corresponding supplemental frame from among the plurality of corresponding supplemental frames.

There is also provided in accordance with a still another preferred embodiment of the present invention at a video receiver, a system for producing a video playback stream arranged to assist reverse trick mode playback, the system including broadcast video stream receiving means for receiving a broadcast video stream, video decoding means for decoding the broadcast video stream, frame selecting means for selecting a uni-directional predicted frame from the broadcast video stream, the uni-directional frame including a last uni-directional frame in a first group of pictures (GOP), frame creating means for creating a substitute frame for the selected uni-directional frame, the substitute frame being based on an initial key frame included in a next GOP, the frame creating means being further operative to create a plurality of substitute frames for a plurality of uni-directional frames included in the first GOP, each substitute frame of the plurality of substitute frames corresponding to one uni-directional frame included in the first GOP, the creating being based on a preceding uni-directional frame, presentation time stamp stamping means for stamping each substitute frame with a presentation time stamp (PTS), the PTS being identical to a PTS associated with the corresponding one P-frame for each substitute frame, and video recording means for recording a video stream, the video stream including the plurality of substitute frames arranged in reverse processing order.

There is also provided in accordance with a still another preferred embodiment of the present invention a system for generating an auxiliary video stream for reverse trick mode play, the system including primary video stream providing means for providing a primary video stream, the primary video stream including at least one group of pictures, the group of pictures commencing with a first key frame and terminating with a frame immediately preceding a second key frame, the group of pictures further including at least one uni-directional predicted frame and a plurality of bi-directional predicted frames, frame predicting means for predicting, on the basis of the second key frame, a substitute frame, and auxiliary video stream creating means for creating the auxiliary video stream, the auxiliary video stream creating means including frame substituting means for substituting the at least one uni-directional predicted frame with the substitute frame, the frame predicting means being further operative to predict, for each additional uni-directional predicted frame in the primary video stream, on the basis of a following uni-directional predicted frame, a corresponding substitute frame, and frame substituting means for substituting each additional uni-directional predicted frame with the corresponding substitute frame, thereby creating an auxiliary video stream for reverse trick mode play.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
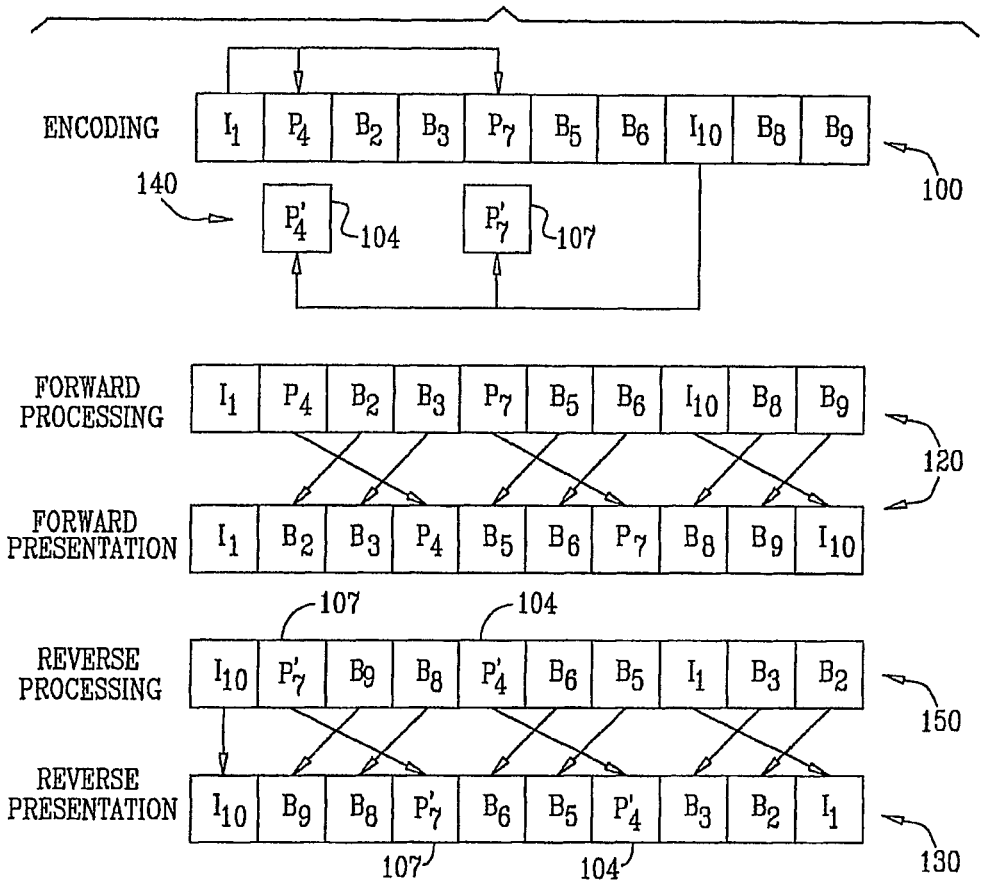
FIG. 1 is a simplified pictorial illustration of encoding, processing, and presentation of an exemplary video stream constructed and operative in accordance with a first preferred embodiment of the present invention.

Reference is now made to FIG. 1, which is a simplified pictorial illustration of encoding, processing, and presentation of an exemplary video stream constructed and operative in accordance with a first preferred embodiment of the present invention. The exemplary video stream is depicted in FIG. 1 in several different aspects, which are now explained.

As a matter of convenience, compression schemes such as MPEG-2, MPEG-4, and VC-1 recognize a unit known as a Group of Pictures (GOP). A GOP typically comprises a series of frames beginning with an I-frame, or, in MPEG-4, Part 10, either an I-frame or an IDR-frame, and ending with a frame immediately before a next I-frame or a next IDR-frame. For the purposes of the following discussion, IDR-frames are related to as though they are identical to I-frames.

The GOP continues, after an initial I-frame, with P-frames and B-frames. The P-frames and B-frames represent changes from the initial I-frame, as is well known in the art and is explained in the standards documents referred to above. When encoding the video stream for playing in the forward direction, the frames in the stream are typically output by a video encoder in the order:

$I_1 P_4 B_2 B_3 P_7 B_5 B_6 I_{10} B_5 B_6$ (100).

When the same stream is played back at a decoder, the processing and presentation order is typically:

$I_1$ (process $P_4$, $B_2$) $B_2$ (process $B_3$) $B_3$ $P_4$ (process $P_7$, $B_5$) $B_5$ (process $B_6$) $B_6$ $P_7$ (process $I_{10}$, $B_8$) $B_8$ (process $B_9$) $B_9$ $I_{10}$ (120).

However, in order to play the same stream backwards in a trick mode, and play the GOP in reverse order:

$I_{10} B_9 B_8 P_7 B_6 B_5 P_4 B_3 B_2 I_1$ (130), the decoder typically reads in and process the GOP as follows: (read the entire GOP into memory and process $I_1$, $P_4$, $P_7$, $I_{10}$) $I_{10}$ (process $B_9$) $B_9$ (process $B_8$) $B_8$ (retrieve $P_7$ from memory or reprocess $P_7$) $P_7$ (process $B_6$) $B_6$ (process $B_5$) $B_5$ (retrieve $P_4$ from memory or reprocess $P_4$) $P_4$ (process $B_3$) $B_3$ (process $B_2$) $B_2$ (retrieve $I_1$ from memory or reprocess $I_1$) $I_1$.

In some streams, the GOP is very long, and performing a reverse decoding as described above presents a drain on decoder resources. In some systems, the frequency of I-frames is 1 or 2 every second, but I-frame frequency is variable, and has been observed, in some cases, to be as few as one I-frame nearly every 3 seconds. In such a system, the GOP approaches 90 frames in length. In order to display the last B-frame of a 90 frame GOP in a reverse trick mode, the original I-frame and all intervening P-frames must be read into memory and processed. Reading the original I-frame and all intervening P-frames takes a longer time and consumes more memory than a comparable forward reading of the same GOP. Certain decryption systems fail if decryptor chip design does not allow proper reading of the original I-frame and all intervening P-frames. A "clean" failure results in skipped frames, and thus a jumpy picture. A "sloppy" failure may result in more serious failures such as, for example, memory leaks in the decryptor chip.

It is appreciated that in a system performing a trick mode rewind utilizing only I-frames, time and memory considerations are not relevant. However, such an I-frame-only rewind is not perceived as smooth by a viewer. Specifically, I-frame-only rewinds may have to skip over a variable number of intervening predicted frames between displayed I-frames.

A first approach to solving the problem presented above is depicted in FIG. 1. The first approach envisions a solution implemented at a video encoder. The video encoder preferably produces both a forward stream 100, as described above and depicted in FIG. 1, and additional data 104, 107. The additional data preferably comprises a second P-frame (P') 104, 107 for each P-frame in the forward GOP. The P' frame, however preferably is predicted and encoded using the I-frame of the following GOP. Thus, in the stream described above and depicted in FIG. 1, the video encoder produces P-frame $P_4$ and P-frame $P_7$ based on I-frame $I_1$. Additional P' frame $P_4'$ 104 and P'-frame $P_7'$ 107 are produced by the video encoder based on I-frame $I_{10}$. It is appreciated that the format of the P'-frames is preferably identical to the format of a standard P-frame, and that the P'-frames may be produced using the same methods well-known in the art for producing standard P-frames, except that, unlike a standard P-frame, the P'-frame references the following I-frame and not the previous I-frame. Alternatively, where it is more efficient to produce an I-frame instead of a P'-frame, an I-frame is preferably produced.

In some cases, the byte-size of the final P'-frame comprised in the GOP thus produced is likely to approach the byte-size of an I-frame. Such a large P'-frame is likely to be produced by a video encoder which typically creates a new I-frame at a scene boundary. It is appreciated that such encoders are found more and more frequently in use.

During transmission, the P'-frames are broadcast separately from the stream 100, preferably in a separate auxiliary stream 140 comprising P'-frames 104, 107, the auxiliary stream 140 being a clearly signaled addition to the regular broadcast stream. Those skilled in the art will appreciate that adding the auxiliary stream 140 consumes extra bandwidth.

In some preferred embodiments, P'-frames may preferably be transmitted in a separate stream with a separate PID (program identifier). In some preferred embodiments of the present invention, the stream comprising P'-frames may preferably be broadcast later than the regular stream, as the P'-frames are not needed in real time viewing. Each P' frame preferably comprises a presentation time stamp (PTS) identical to the P-frame to which it corresponds. For example and without limiting the generality of the foregoing, $P_4$ and $P_4'$ 104 possess the same PTS.

It is appreciated that, typically, audio is not played backwards during a rewind, and thus, there is no corresponding-backwards transmission of an audio stream.

At a receiver, such as a personal video-recorder (PVR), the stream 100 and the auxiliary stream 140 comprising the P'-frames 104, 107 are preferably both received and recorded. Both streams are preferably recorded with any original encryption which was applied by a broadcaster. Those skilled in the art will appreciate that the both streams may be recorded by any other appropriate recorder, such as, and without limiting the generality of the foregoing, a DVD recorder.

Preferably, recording-time indexing based on an unencrypted header and/or other broadcaster inserted markers in the broadcast stream will be used to identify I-frames and P-frames during recording. Such a system (which identifies I-frames) is described in WO 01/35669, corresponding U.S. Ser. No. 09/574,096, WO 03/010970, and corresponding U.S. Ser. No. 10/479,373, referred to above, the disclosures of which are incorporated herein by reference. Alternatively, the system described in PCT/2005/000685 may also be used to identify I-frames and P-frames during recording. The disclosure of PCT Patent Application PCT/2005/000685 is hereby incorporated herein by reference. It is appreciated that if no broadcaster inserted markers identifying the I-frames and P-frames are available to the decoder, trick mode reverse playback requires decryption and processing of the entire GOP.

During playback, when trick mode smooth rewind is required, the PVR will preferably retrieve the standard video stream, and preferably replace or reference all P-frames with their corresponding P'-frames. The decoder will then play the stream backwards, each frame according to its PTS, as is typically found for rewind trick modes commercially available at the present time. However, the GOP is preferably processed back-wards. Thus, for the standard order described above and depicted in FIG. 1:

$I_1 P_4 B_2 B_3 P_7 B_5 B_6 I_{10} B_5 B_6$ (100)

and an auxiliary stream comprising frames:

$P_4' P_7'$ (140), the decoder will read frame $I_{10}$ into memory, display frame $I_{10}$, process frame $P_{7'}$, process and display frames $B_9$ and $B_8$, and so forth as follows, and as depicted in FIG. 1:

$I_{10} P_{7'} B_9 B_8 P_4' B_6 B_5 I_1 B_3 B_2$ (150), thereby displaying the frames in the stream in reverse order:

$I_{10} B_9 B_8 P_{7'} B_6 B_5 P_4' B_3 B_2 I_1$ (130).

It is appreciated that processing resources required to process the stream depicted above and in FIG. 1 for a rewind trick mode are nearly identical to the processing resources required to process the stream depicted above and in FIG. 1 for forward playback. Nevertheless, the stream and the PTS of the stream, in rewind trick mode, runs backwards from the I-frame at the start of the next GOP (depicted as $I_{10}$) to the I-frame at the start of the present GOP (depicted as $I_1$). Furthermore, there is no need to read an entire GOP into memory. Rather, the same number of frames as in forward playback is preferably read into memory during trick mode rewind.

It is appreciated that in an environment where long GOPs are supported, each P'-frame may preferably be produced from a "corresponding I-frame" rather than from the corresponding P-frame, as explained below. The corresponding I-frame, in typical operation of the method described above preferably comprises the I-frame at the start of a next GOP (depicted as $I_{10}$). It is appreciated that using the I-frame at the start of the present GOP (depicted as $I_1$) would still provide many of the advantages described above. For example, in a case where the I-frame at the start of a next GOP is the new I-frame at a scene boundary, it is preferable to produce P'-frames from the start of the present I-frame.

Although producing the P'-frames from the corresponding I-frame rather than the corresponding P-frame requires more complex software, such a production method may allow certain decoders a greater flexibility of rewind decode speeds.

In a networked environment, where the decoder is located at a client, if the decoder has sufficient memory to store a plurality of frames, then a server may preferably send the P'-frames at the same time as the P-frames. Sending the P'-frames at the same time as the P-frames enables the client to display as many frames in reverse play as in forward play.

Those skilled in the art will appreciate that the method described above is particularly (but not exclusively) useful when preparing a DVD or other pre-encoded medium. It is also appreciated that the method described above is appropriate for any video encoding format which relies on intracoded frames and predicted frames, such as, and not limited to, MPEG-2, MPEG-4 part 10, and VC-1. Nevertheless, as is well shown in the art, MPEG-4 part 10 complicates the concept of P-frames and B-frames and reference and non-reference frames. While the present discussion of P'-frames concentrates on MPEG-2 frames, the methods described herein apply as well to MPEG-4 part 10 and VC-1, applying to reference frames rather than P-frames. Those skilled in the art will appreciate that in MPEG-4 part 10 there is a larger number of reference frames than in MPEG-2.

The inventors of the present invention are of the opinion that the P'-frame will most likely not be exact pixel equivalents of the P-frame to which it corresponds, except at very high bit rates. Therefore, B-frames generated from P'-frames will not be exactly equivalent to B-frames that would be generated from the corresponding P-frames. The lack of exact equivalence between the frames will, in turn, result in a slight degradation of quality of the video. However, broadcasters might accept the slight degradation of quality in exchange for easily implemented reverse trick modes.

In an alternative preferred embodiment of the present invention, in a system which preferably does not require maintaining broadcast encryption on recorded content or in a system in which the extra bandwidth required to broadcast the P' frames is undesirable, it is possible to create the P' frames at the decoder.

Figure 2:
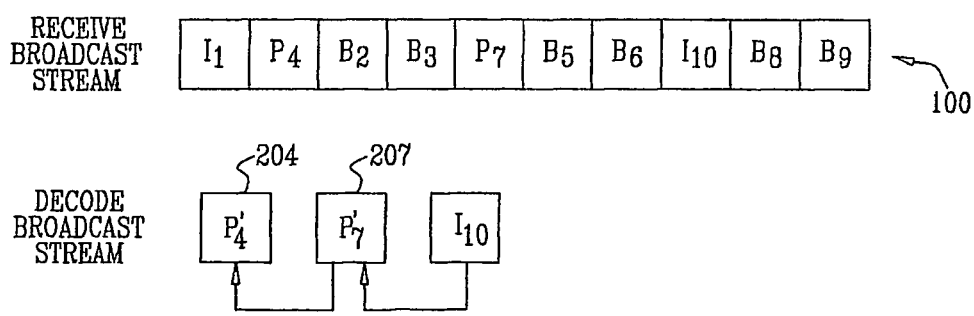
FIG. 2 is a simplified pictorial illustration of encoding, processing, and presentation of an exemplary video stream constructed and operative in accordance with a second preferred embodiment of the present invention.
Figure 3:
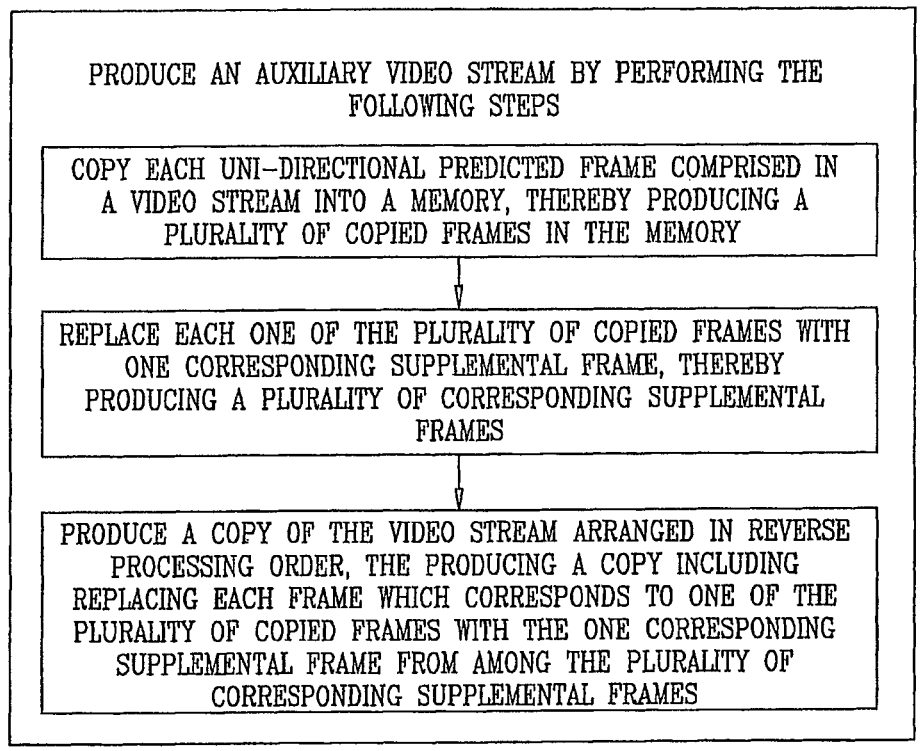
FIGS. 3-9 are simplified flowcharts of preferred methods of operation of the system of FIG. 1.
Figure 4:
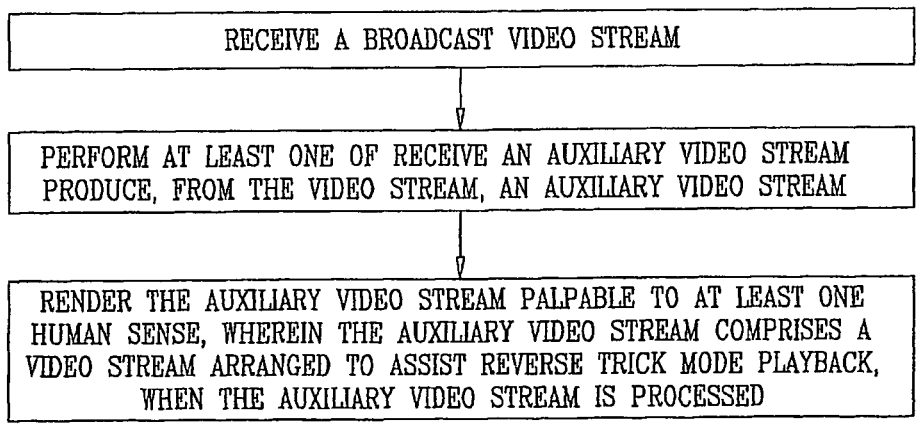
Figure 5:
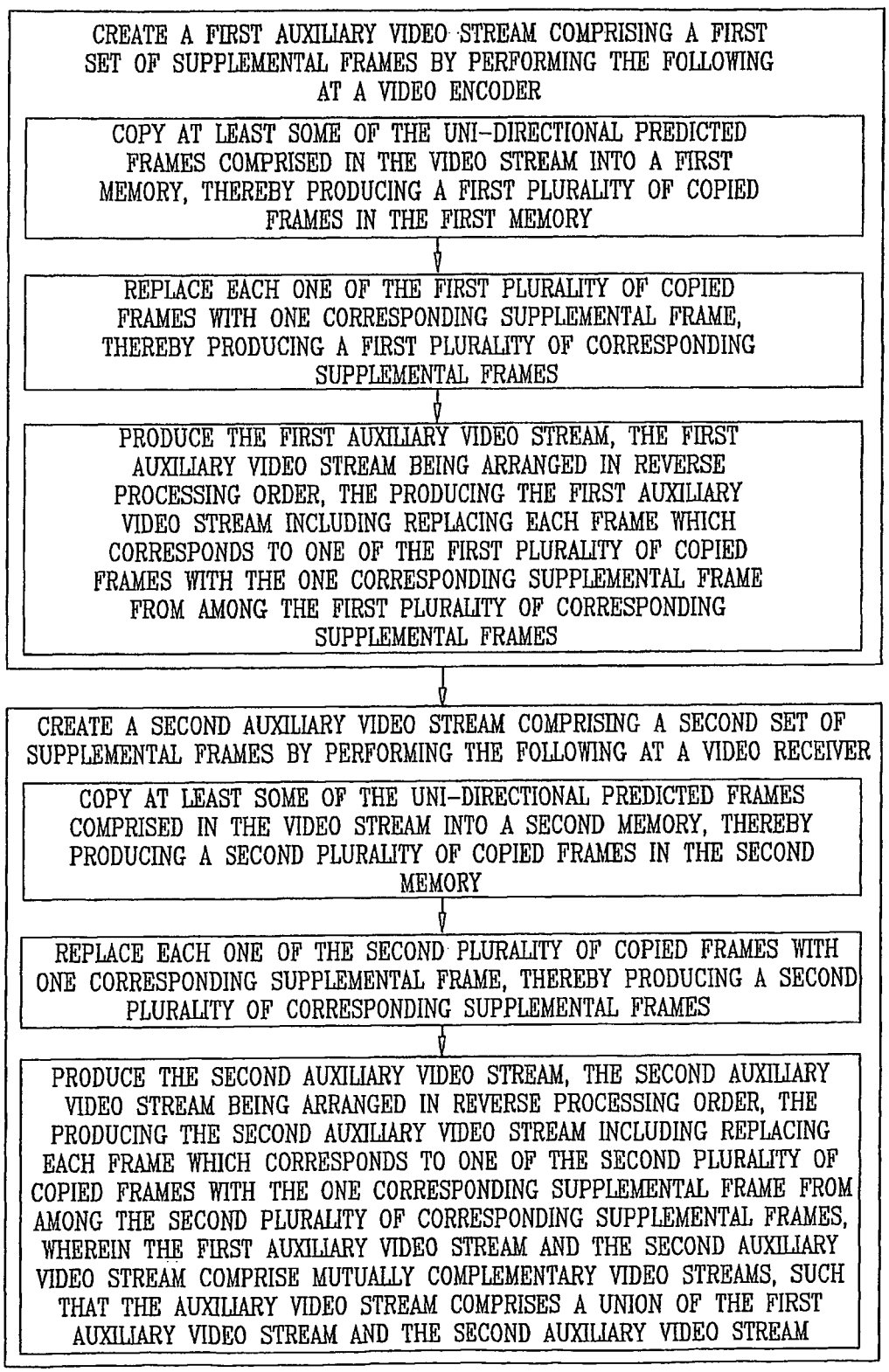
Figure 6:
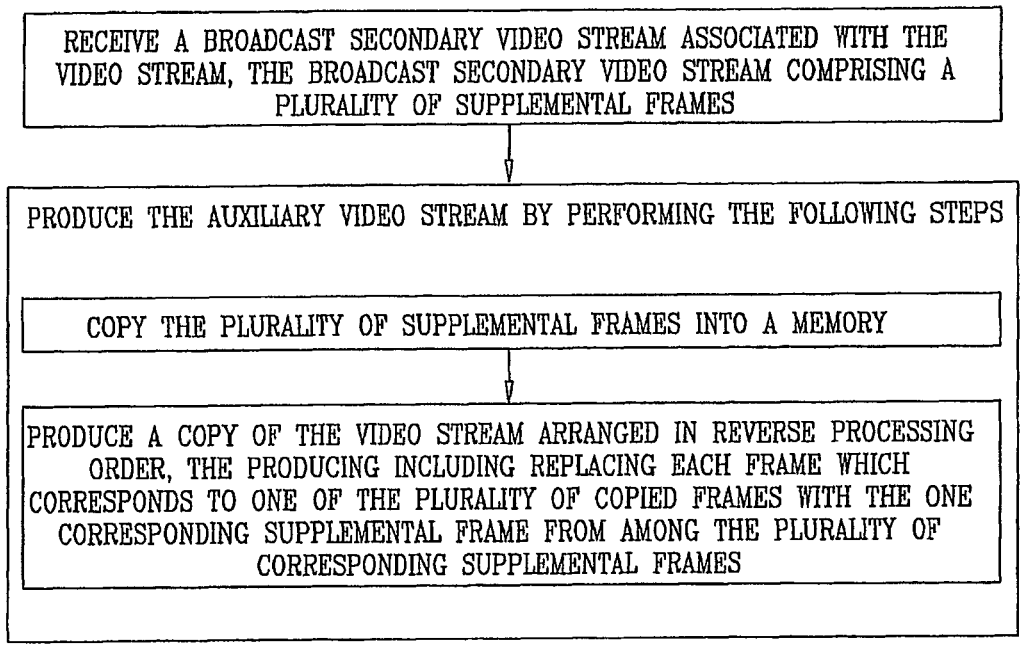
Figure 7:
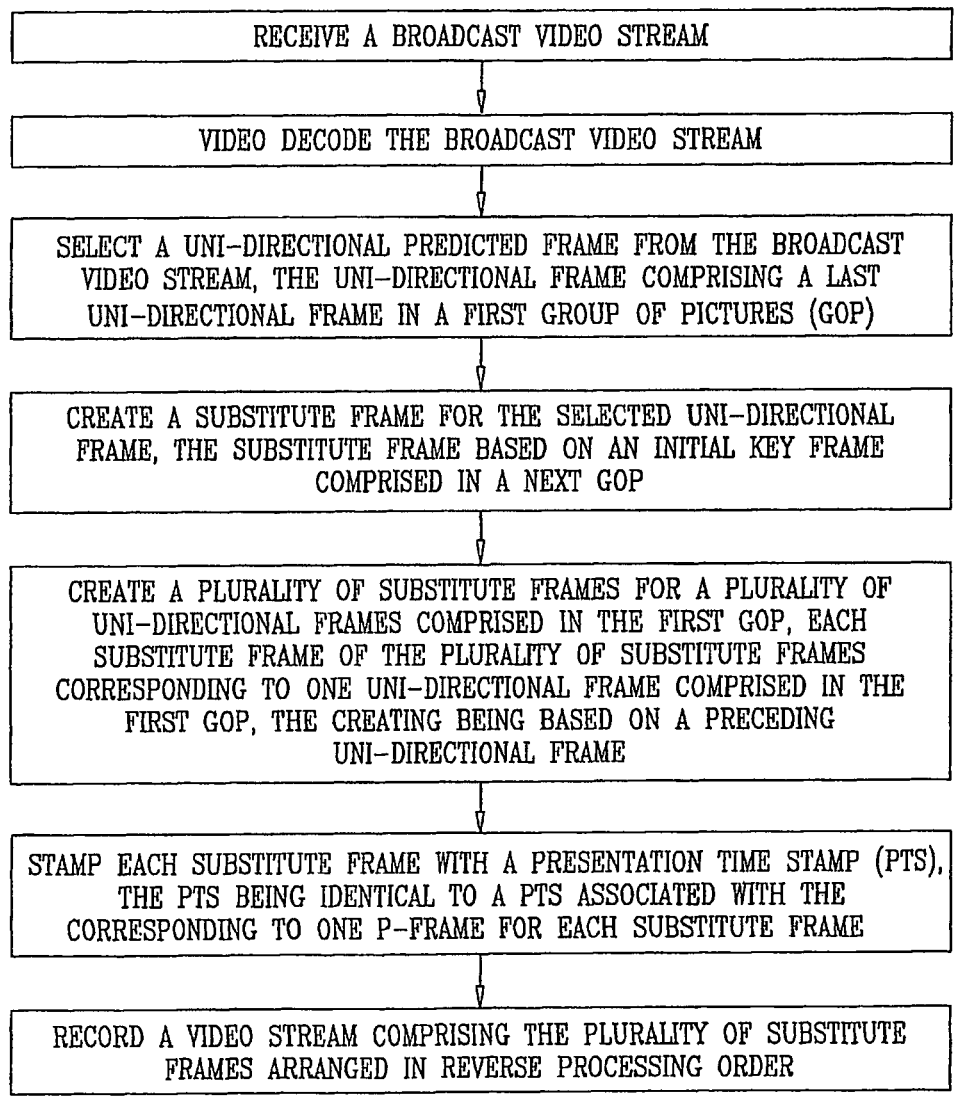
Figure 8:
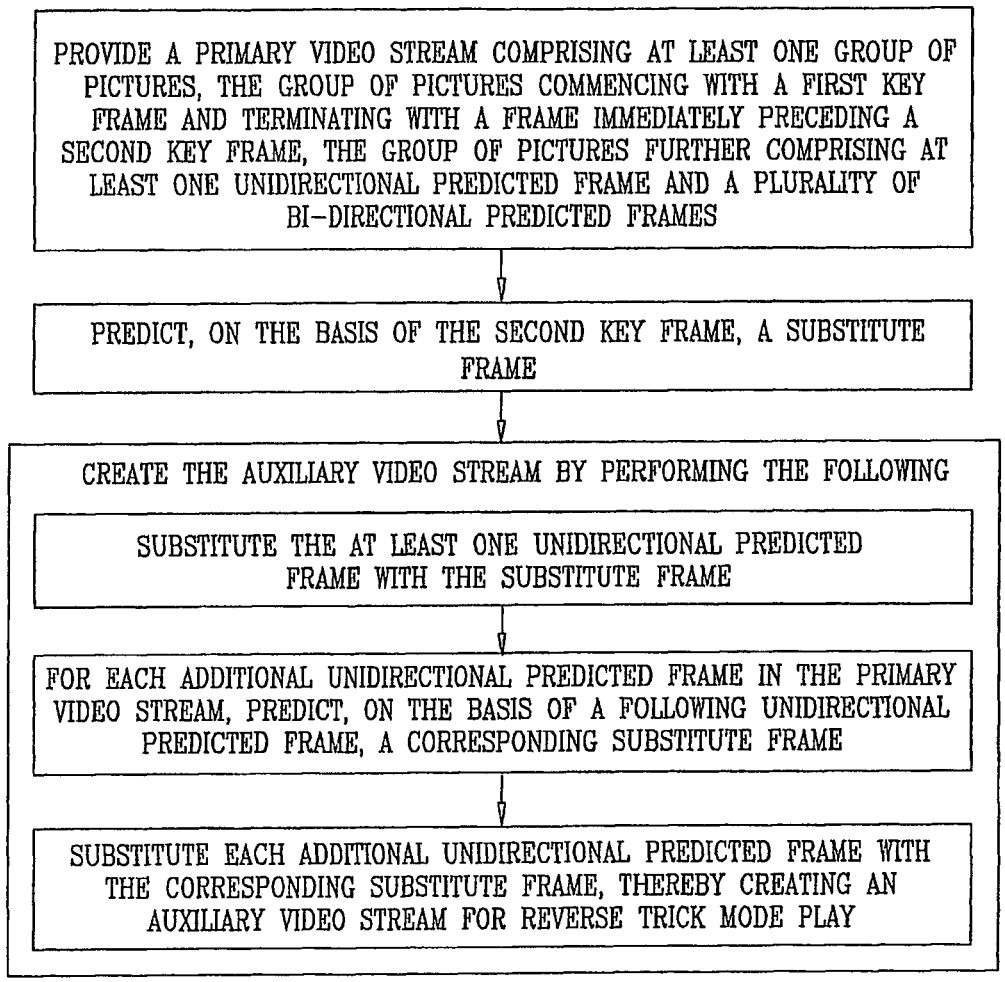
Figure 9:
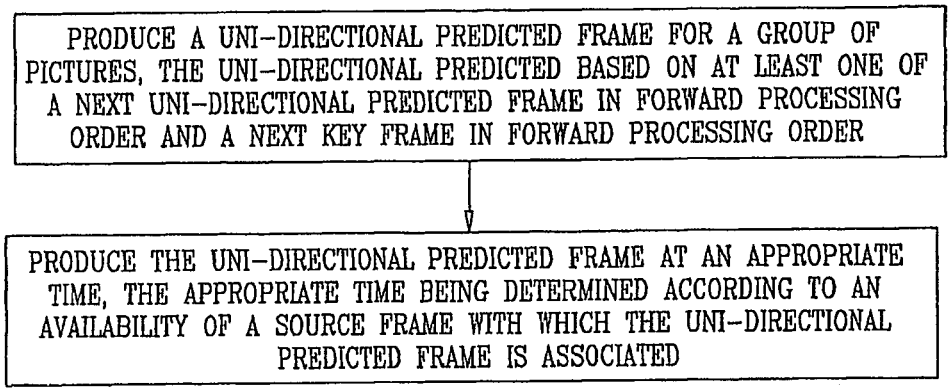

Reference is now made to FIG. 2, which is a simplified pictorial illustration of encoding, processing, and presentation of an exemplary video stream constructed and operative in accordance with a second preferred embodiment of the present invention. A broadcast stream is received at the decoder, the frames comprising the broadcast stream arriving at the decoder in the order: $I_1 P_4 B_2 B_3 P_7 B_5 B_6 I_{10} B_5 B_6$ (100).

The decoder preferably records the stream with or without original broadcast encryption, and with or without local encryption, as appropriate.

The broadcast stream is preferably decrypted and decoded. Those skilled in the art will appreciate that decryption may preferably be performed in an appropriate secure processor. An example of a secure processor is SVP, is described in detail at www.svpalliance.org.

As the decoder decodes the (decrypted) frames described above, frame $P_7$ will preferably be stored in memory. When frame $I_{10}$ is decoded by the decoder, frame $P_7'$ 207 is preferably created based on frame $I_{10}$. Frame $P_4'$ 204 is then preferably created based on frame $P_7'$ 207. Frames $P_4'$ 204 and $P_7'$ 207 are then preferably recorded, such that the PTS of frame $P_4'$ 204 is the same as the PTS frame $P_4$, and the PTS of frame $P_7'$ 207 is the same as the PTS frame $P_7$. Frames $P_4'$ 204 and $P_7'$ 207 may optionally be encrypted with local encryption. Upon creation, P'-frames 204, 207 are preferably stored for later use. Where local encryption is applied, the P'-frames 204, 207 are preferably also locally encrypted.

It is also appreciated that the method describe above with reference to FIG. 2 is appropriate for use with broadcast streams encrypted by a conditional access system, and particularly for a conditional access system which does not store recorded content with original encryption, or in cases where the PVR is authorized to decrypt content and produce a decryption key (also called a "control word") at recording time, even if the PVR stores the broadcast stream with original encryption. The PVR preferably stores the received content in its original encrypted state with or without local encryption, in addition to storing the new P'-frames with or without local encryption. Alternatively the PVR preferably stores the received content without original encryption, having decrypted the received content in order to prepare the P' frames. The PVR then preferably applies or does not apply local encryption as required, before storing both the received content and the P' frames.

Playout of the recorded stream in a rewind trick mode in the present embodiment is identical to the playout method described above for the first preferred embodiment of the present invention.

Since the broadcast stream can be recorded with local and/or broadcast encryption, conditional access control can preferably be maintained if the decryption of the signal; creation of frames $P_4'$ 204 and $P_7'$ 207; and playout all preferably occur in a secure environment. For example, and without limiting the generality of the foregoing, the decryption, creation, and playout preferably occur in a single integrated circuit.

Alternatively, the decoder may not produce the P'-frames, and, rather, may replace the P-frames with I-frames. I-frames are simpler to produce, and the ease of I-frame production may be desirable with certain decoder chipsets. It is appreciated that I-frames require more disk space than P-frames and P'-frames. Nevertheless, as the produced I-frames are usable in the forward and reverse directions, the increase in required disk space is not measured by comparing P'-frames to I-frames. Rather, the I-frame effectively replaces both the P-frame and the corresponding P'-frame, thus, (assuming pixel accurate representation in the P'-frame), the storage cost of adding an I-frame should be compared to the storage savings of not having to record both the P-frame and the P'-frame.

The method of replacing P-frames with I-frames instead of P'-frames and may alternatively be used when the auxiliary stream is produced at the encoder, as described above with respect to the method of FIG. 1. Those skilled in the art will appreciate that if P-frames are replaced with I-frames at the encoder, bandwidth considerations apply in addition to storage considerations, as described above.

The benefit of having a greater flexibility of rewind decode speeds results from using I-frames rather than P'-frames because I-frames can be decoded effectively instantly, and thus there is no resource-imposed limit due to a potentially very large number of frames requiring decoding. On the other hand, the benefit of using I-frames is offset by an increase in bandwidth and in disk usage.

Trick modes typically comprise faster speed play, either forward or reverse. In order to enhance the viewer's experience, it is preferable to display some number of frames, skipping over intermediate frames. For example and without limiting the generality of the foregoing, for 10× fast forward, every tenth frame may be played. However, due to limitations discussed above, displaying only some frames typically requires decoding many more frames than are displayed. Therefore, it is preferable to streamline trick mode playback by selecting for display either I-frames only or a combination of I-frames and P-frames. It is further appreciated that replacing P-frames with I-frames also increases the number of I-frames available for I-frame only trick mode. If more I-frames are available, I-frame-only trick modes will consequently appear smoother to the viewer.

Those skilled in the art will appreciate that storing extra P'-frames requires extra disk storage space. The inventors of the present invention are of the opinion that as storage disks are typically becoming larger in PVRs, the trade off of storage space for ease of reverse trick mode is becoming less and less critical.

Still another preferred embodiment of the present invention comprises a combination of the previously discussed preferred embodiments of the present invention. Those skilled in the art will appreciated that the first preferred embodiment of the present invention discussed above requires an overhead in the transmission of the additional P' or I' frames. There are clear benefits in minimizing any increase in the transmission overheads. It is also appreciated that the second preferred embodiment of the present invention discussed above requires an overhead in processing on the decoder to generate the new P' or I' prime frames. Accordingly, some, but not all, of the required P' or I' frames are produced by the video encoder for broadcast. The decoder preferably identifies missing P' or I' frames and preferably locally generates the missing P' or I' frames, thereby reducing the overhead on the decoder.

By way of a non-limiting example, consider the GOP:
$I_1 B_2 B_3 P_4 B_5 B_6 P_7 B_8 B_9 P_{10} B_{11} B_{12} P_{13} B_{14} B_{15}$ Utilizing the first preferred embodiment of the present invention, the additional frames:
$P'_4 P'_7 P'_{10} P'_{14}$
would preferably be transmitted. By the second preferred embodiment of the present invention, frames $P'_4 P'_7 P'_{10} P'_{14}$ would be generated locally.

In the present preferred embodiment of the present invention method, as a non-limiting example, frames
P'10 P'14
only would preferably be transmitted, and complementary frames
$P'_4 P'_7$
would preferably be generated locally. It is appreciated that any division of the transmitted frames and locally generated frames is possible.

Reference is now made to FIGS. 1-9, which are simplified flowcharts of preferred methods of operation of the system of FIG. 1. FIGS. 1-9 are believed to be self explanatory in light of the above discussion.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for producing an auxiliary video stream arranged for reverse trick mode playback from a video stream comprising a plurality of groups of pictures (GOPs), each GOP comprising an intra-coded frame and a plurality of uni-directional predicted frames, the method comprising:
producing the auxiliary video stream by performing the following steps:
selecting at least one uni-directional predicted frame from a first GOP of the broadcast video stream;
copying the at least one uni-directional predicted frame comprised in the video stream into a memory;
creating at least one substitute frame for the at least one uni-directional frame comprised in the first GOP, each substitute frame of the plurality of substitute frames corresponding to one of the at least one uni-directional frames comprised in the first GOP, the creating the at least one substitute frame being based on only one of: a next intra-coded frame and a next uni-directional frame;
replacing the at least one uni-directional predicted frame with the at least one substitute frame; and
producing a copy of the video stream arranged in reverse processing order, the producing a copy including replacing each frame which corresponds to one of the plurality of copied frames with the one corresponding supplemental frame from among the plurality of corresponding supplemental frames.

2. The method according to claim 1 and wherein the method is performed at a video encoder.

3. The method according to claim 2 and wherein the video encoder comprises an MPEG-2 video encoder.

4. The method according to claim 2 and wherein the video encoder comprises an MPEG-4 part 2 video encoder.

5. The method according to claim 2 and wherein the video encoder comprises an MPEG-4 part 10 video encoder.

6. The method according to claim 2 and wherein the video encoder comprises a VC-1 video encoder.

7. The method according to claim 1 and wherein the method is performed at a video receiver.

8. The method according to claim 7 and wherein the video receiver comprises a personal video recorder (PVR).

9. The method according to claim 7 and wherein the video receiver comprises a DVD recorder.

10. The method according to claim 8 and wherein the video receiver records the auxiliary video stream.

11. The method according to claim 10 and wherein the video receiver records the auxiliary video stream as an encrypted stream.

12. The method according to claim 8 and wherein the video receiver records the video stream.

13. The method according to claim 1 and wherein the plurality of uni-directional predicted frames comprises a plurality of P-frames.

14. The method according to claim 1 and wherein the plurality of supplemental frames comprises a plurality of P-frames.

15. The method according to claim 1 and wherein the plurality of supplemental frames comprises a plurality of I-frames.

16. The method according to claim 1 and wherein the plurality of supplemental frames comprises a combination of
at least one P-frame; and
at least one I-frame.

17. The method according to claim 1 and also comprising associating each one of the plurality of supplemental frames with a corresponding uni-directional predicted frame in the video stream.

18. The method according to claim 17 and wherein the associating comprises stamping each one of the plurality of supplemental frames with a presentation time stamp (PTS) identical to a PTS associated with the corresponding frame.

19. A method for trick mode smooth rewind at a receiver, the method comprising:
receiving a broadcast video stream;
performing at least one of:
receiving an auxiliary video stream; and
producing, from the video stream, an auxiliary video stream; and
rendering the auxiliary video stream palpable to at least one human sense,
wherein the auxiliary video stream comprises a video stream arranged to assist reverse trick mode playback when the auxiliary video stream is processed, and comprises at least one substitute uni-directional frame for at least one uni-directional frame comprised in the auxiliary video stream, the at least one substitute uni-directional frame corresponding to at least one uni-directional frame comprised in the broadcast video stream, the at least one uni-directional frame having been created based on only one of: a next intra-coded frame and a next uni-directional frame, and the auxiliary video stream comprises at least one of:
at least one P-frame; and
at least one B-frame.

20. A method performed at a video recorder for producing an auxiliary video stream arranged for reverse trick mode playback from a video stream comprising a plurality of uni-directional predicted frames, the method comprising:
receiving a broadcast secondary video stream associated with the video stream, the broadcast secondary video stream comprising a plurality of supplemental frames, the broadcast secondary stream comprising at least one uni-directional frame which is created on the basis of only one of: a next intra-coded frame and a next uni-directional frame;
producing the auxiliary video stream by performing the following steps:
copying the plurality of supplemental frames into a memory; and
producing a copy of the video stream arranged in reverse processing order, the producing including replacing each frame which corresponds to one of the plurality of copied frames with the one corresponding supplemental frame from among the plurality of corresponding supplemental frames.

21. A system for producing an auxiliary video stream arranged for reverse trick mode playback from a video stream comprising a plurality of groups of pictures (GOPs), each GOP comprising an intra-coded frame and a plurality of uni-directional predicted frames, the system comprising:
a video producer operative to produce the auxiliary video stream, the video producer comprising:
a selector operative to select at least one uni-directional predicted frame from a first GOP of the broadcast video stream;
a frame copier operative to copy the at least one uni-directional predicted frame comprised in the video stream into a memory;
a frame creator operative to create at least one substitute frame for the at least one uni-directional frame comprised in the first GOP, each substitute frame of the plurality of substitute frames corresponding to one of the at least one uni-directional frames comprised in the first GOP, the creating the at least one substitute frame being based on only one of: a next intra-coded frame and a next uni-directional frame;
a frame replacer operative to replace the at least one uni-directional predicted frame with the at least one substitute frame; and
a video stream producer operative to produce a copy of the video stream arranged in reverse processing order, the producing a copy including replacing each frame which corresponds to one of the plurality of copied frames with the one corresponding supplemental frame from among the plurality of corresponding supplemental frames.

22. A system for trick mode smooth rewind at a receiver, the system comprising:
a receiver operative to receive a broadcast video stream, the receiver comprising at least one of:
an auxiliary stream receiver operative to receive an auxiliary video stream; and
an auxiliary stream producer operative to produce, from the video stream, an auxiliary video stream; and
a rendering unit, operative to render the auxiliary video stream palpable to at least one human sense,
wherein the auxiliary video stream comprises a video stream arranged to assist reverse trick mode playback when the auxiliary video stream is processed, and comprising at least one substitute uni-directional frame for at least one uni-directional frame comprised in the auxiliary video stream, the at least one substitute uni-directional frame corresponding to at least one uni-directional frame comprised in the broadcast video stream, the at least one uni-directional frame having been created based on only one of: a next intra-coded frame and a next uni-directional frame, and the auxiliary video stream comprises at least one of:
at least one P-frame; and
at least one B-frame.

23. A system disposed at a video recorder for producing an auxiliary video stream arranged for reverse trick mode playback from a video stream comprising a plurality of uni-directional predicted frames, the system comprising:
a video stream receiver operative to receive a broadcast secondary video stream associated with the video stream, the broadcast secondary video stream comprising a plurality of supplemental frames comprising at least one uni-directional frame which is created on the basis of only one of: a next intra-coded frame and a next uni-directional frame;
an auxiliary video stream producer operative to produce the auxiliary video stream, the auxiliary video stream producer comprising:
a frame copier operative to copy the plurality of supplemental frames into a memory; and
a producer operative to produce a copy of the video stream arranged in reverse processing order, the producer being further operative to replace each frame which corresponds to one of the plurality of copied frames with the one corresponding supplemental frame from among the plurality of corresponding supplemental frames.

24. A system for producing an auxiliary video stream arranged for reverse trick mode playback from a video stream comprising a plurality of groups of pictures (GOPs), each GOP comprising an intra-coded frame and a plurality of uni-directional predicted frames, the system comprising:
video producing means for producing the auxiliary video stream, the video producing means comprising:
frame selecting means for selecting at least one uni-directional predicted frame from a first GOP of the broadcast video stream;
frame copying means for copying the at least one uni-directional predicted frame comprised in the video stream into a memory;
frame creating means for creating at least one substitute frame for the at least one uni-directional frame comprised in the first GOP, each substitute frame of the plurality of substitute frames corresponding to one of the at least one uni-directional frames comprised in the first GOP, the creating the at least one substitute frame being based on only one of: a next intra-coded frame and a next uni-directional frame;
frame replacing means for replacing the at least one uni-directional predicted frame with the at least one substitute frame; and
video stream producing means for producing a copy of the video stream arranged in reverse processing order, the producing a copy including replacing each frame which corresponds to one of the plurality of copied frames with the one corresponding supplemental frame from among the plurality of corresponding supplemental frames.

25. A system for trick mode smooth rewind at a receiver, the system comprising:
receiving means for receiving a broadcast video stream, the receiving means comprising at least one of:
auxiliary stream receiving means for receiving an auxiliary video stream; and
auxiliary stream producing means for producing, from the video stream, an auxiliary video stream; and
rendering means for rendering the auxiliary video stream palpable to at least one human sense,
wherein the auxiliary video stream comprises a video stream arranged to assist reverse trick mode playback when the auxiliary video stream is processed, and comprising at least one substitute uni-directional frame for at least one uni-directional frame comprised in the auxiliary video stream, the at least one substitute uni-directional frame corresponding to at least one uni-directional frame comprised in the broadcast video stream, the at least one uni-directional frame having been created based on only one of a next intra-coded frame and a next uni-directional frame, and the auxiliary video stream comprises at least one of:
at least one P-frame; and
at least one B-frame.

26. A system disposed at a video recorder for producing an auxiliary video stream arranged for reverse trick mode playback from a video stream comprising a plurality of uni-directional predicted frames, the system comprising:
video stream receiving means for receiving a broadcast secondary video stream associated with the video stream, the broadcast secondary video stream comprising a plurality of supplemental frames comprising at least one uni-directional frame which is created on the basis of only one of: a next intra-coded frame and a next uni-directional frame;
auxiliary video stream producing means for producing the auxiliary video stream, the auxiliary video stream producing means comprising:
frame copying means for copying the plurality of supplemental frames into a memory; and
producing means for producing a copy of the video stream arranged in reverse processing order, the producing means being further operative to replace each frame which corresponds to one of the plurality of copied frames with the one corresponding supplemental frame from among the plurality of corresponding supplemental frames.

27. A non-transitory recording medium comprising an auxiliary video stream arranged for reverse trick mode playback from a video stream comprising a plurality of groups of pictures (GOPs), each GOP comprising an intra-coded frame and a plurality of uni-directional predicted frames, the auxiliary video stream comprising a stream produced by the following steps:
selecting at least one uni-directional predicted frame from a first GOP of the broadcast video stream;
copying the at least one uni-directional predicted frame comprised in the video stream into a memory;
creating at least one substitute frame for the at least one uni-directional frame comprised in the first GOP, each substitute frame of the plurality of substitute frames corresponding to one of the at least one uni-directional frames comprised in the first GOP, the creating the at least one substitute frame being based on only one of: a next intra-coded frame and a next uni-directional frame;
replacing the at least one uni-directional predicted frame with the at least one substitute frame;
producing a copy of the video stream arranged in reverse processing order, the producing a copy including replacing each frame which corresponds to one of the plurality of copied frames with the one corresponding supplemental frame from among the plurality of corresponding supplemental frames.

28. The non-transitory recording medium comprising the auxiliary video stream according to claim 27, wherein the non-transitory recording medium comprises a DVD.

29. The non-transitory recording medium comprising the auxiliary video stream according to claim 27, wherein the non-transitory recording medium comprises a hard disk drive.

* * * * *

UNITED STATES PATENT AND TRADEMARK OFFICE
CERTIFICATE OF CORRECTION

| | | |
|---|---|---|
| PATENT NO. | : 8,787,737 B2 | Page 1 of 1 |
| APPLICATION NO. | : 11/990356 | |
| DATED | : July 22, 2014 | |
| INVENTOR(S) | : Wald et al. | |

It is certified that error appears in the above-identified patent and that said Letters Patent is hereby corrected as shown below:

In the Specification

Column 2, line 24, delete "199.6," and substitute therefor --1996,--.

Column 9, line 64, delete "B-frame." and substitute therefor --I-frame.--.

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,787,737 B2 | Page 1 of 1 |
| APPLICATION NO. | : 11/990356 | |
| DATED | : July 22, 2014 | |
| INVENTOR(S) | : Wald et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1465 days.

Signed and Sealed this
Second Day of August, 2016

Michelle K. Lee
*Director of the United States Patent and Trademark Office*